US012769773B2

(12) United States Patent
Subramaniyan et al.

(10) Patent No.: US 12,769,773 B2
(45) Date of Patent: Oct. 20, 2026

(54) CREATING CONTEXT-SPECIFIC, VERSATILE EXPERT AI PERSONAS

(71) Applicant: Articul8 AI, Inc., Santa Clara, CA (US)

(72) Inventors: Arun Karthi Subramaniyan, Santa Clara, CA (US); Felipe A.C. Viana, Santa Clara, CA (US); Chih-Hui Ho, Santa Clara, CA (US)

(73) Assignee: Articul8 AI, Inc., Santa Clara, CA (US)

( * ) Notice: Subject to any disclaimer, the term of this patent is extended or adjusted under 35 U.S.C. 154(b) by 0 days.

(21) Appl. No.: 19/383,524

(22) Filed: Nov. 7, 2025

(65) Prior Publication Data

US 2026/0134011 A1 May 14, 2026

Related U.S. Application Data

(60) Provisional application No. 63/718,392, filed on Nov. 8, 2024.

(51) Int. Cl.
*G06F 16/3329* (2025.01)
*G06F 16/35* (2025.01)
*G06N 20/00* (2019.01)

(52) U.S. Cl.
CPC ........ *G06F 16/33295* (2025.01); *G06F 16/35* (2019.01); *G06N 20/00* (2019.01)

(58) Field of Classification Search
CPC .... G06F 16/00; G06F 16/35; G06F 16/33295; G06N 20/00
See application file for complete search history.

(56) References Cited

U.S. PATENT DOCUMENTS

| | | | |
|---|---|---|---|
| 8,819,620 | B1 | 8/2014 | Volchegursky et al. |
| 2021/0117618 | A1 | 4/2021 | Mishra et al. |
| 2021/0141616 | A1 | 5/2021 | Kane |

(Continued)

FOREIGN PATENT DOCUMENTS

| | | | |
|---|---|---|---|
| CN | 116483970 A | 7/2023 | |
| WO | WO-2026060285 A1 * | 3/2026 | ........... G10L 13/033 |

OTHER PUBLICATIONS

Alshomary, M., Ri, N., Apidianaki, M., Patel, A., Muresan, S. and Mckeown, K., 2024. Latent Space Interpretation for Stylistic Analysis and Explainable Authorship Attribution. arXiv preprint arXiv:2409.07072. (Year: 2024).*

(Continued)

*Primary Examiner* — Sean E Serraguard
(74) *Attorney, Agent, or Firm* — Pillsbury Winthrop Shaw Pittman LLP

(57) ABSTRACT

Provided is a process, including: obtaining a corpus of training records; computing embedding vectors from the training records in an embedding space in which spatial proximity corresponds to similarity in style of communication of the corresponding training records; clustering the embedding vectors to determine a plurality of clusters corresponding to different styles of communication; obtaining a selection of two styles from among the plurality of styles corresponding to two respective clusters among the plurality of clusters; generating an output communication by applying the two selected styles; and storing the output communication in memory.

19 Claims, 3 Drawing Sheets

(56) References Cited

U.S. PATENT DOCUMENTS

| | | | | |
|---|---|---|---|---|
| 2022/0100955 | A1 | 3/2022 | Law et al. | |
| 2023/0084688 | A1 | 3/2023 | Rodrigo Cavalin et al. | |
| 2023/0186617 | A1* | 6/2023 | Karras | G06N 3/094 706/25 |
| 2023/0230198 | A1 | 7/2023 | Zhang et al. | |
| 2024/0054035 | A1 | 2/2024 | Bhargav | |
| 2024/0086757 | A1 | 3/2024 | Pei et al. | |
| 2024/0378858 | A1* | 11/2024 | Ackerman | G06V 10/762 |
| 2025/0363358 | A1* | 11/2025 | Galvin | G06N 3/082 |

OTHER PUBLICATIONS

Radford, Alec et al., Learning Transferable Visual Models From Natural Language Supervision, Feb. 26, 2021, pp. 1-4.

Gatys, Leon A. et al., Image Style Transfer Using Convolutional Neural Networks, published 2016, pp. 2414-2423.

Li, Jiwei et al., A Persona-Based Neural Conversation Model, Mar. 19, 2016, pp. 1-4.

Mcinnes, Leland et al., hdbscan: Hierarchical density based clustering, Journal of Open Source Software (2017), pp. 1-2.

Wang, Yuxuan et al., Style Tokens: Unsupervised Style Modeling, Control and Transfer in End-to-End Speech Synthesis, Mar. 23, 2018, pp. 1-4.

International Search Report and Written Opinion for Application No. PCT/US2025/054698 dated Mar. 19, 2026, pp. 1-10.

Jiaxiang Hu et al., 'Probabilistic net load forecasting based on transformer network and Gaussian process-enabled residual modeling learning method', Renewable Energy, vol. 225, Mar. 3, 2024, pp. 2-6, 8.

S. Sreekumar et al., 'Aggregated Net-load Forecasting using Markov-Chain Monte-Carlo Regression and C-vine copula', Applied Energy, vol. 328, Oct. 30, 2022, p. 4.

Thomas Fel et al., 'Look at the Variance! Efficient Black-box Explanations with Sobol-based Sensitivity Analysis', 35th Conference on Neural Information Processing Systems (NeurIPS 2021), Dec. 6, 2021, p. 2; and figure 1.

David Kappel et al., 'Block-local learning with probabilistic latent representations', 37th Conference on Neural Information Processing Systems (NeurIPS 2023), Dec. 13, 2023, pp. 3-4; and figure 2.

International Search Report and Written Opinion for Application No. PCT/US2025/054699 dated Mar. 26, 2026, pp. 1-10.

Mingyue Yuan et al., 'MAxPrototyper: A Multi-Agent Generation System for Interactive User Interface Prototyping', arXiv:2405.07131 vl, May 2024.

International Search Report and Written Opinion for Application No. PCT/US2025/054697 dated Mar. 19, 2026, pp. 1-10.

Zixuan Huang et al., 'Style Mixer: Semantic-aware Multi-Style Transfer Network', Computer Graphics forum, vol. 38, Issue 7, Nov. 14, 2019.

* cited by examiner

CREATING CONTEXT-SPECIFIC, VERSATILE EXPERT AI PERSONAS

CROSS-REFERENCE TO RELATED APPLICATIONS

This patent claims the benefit of U.S. Provisional Patent Application 63/718,392, filed Nov. 8, 2024, titled CREATING CONTEXT-SPECIFIC, VERSATILE EXPERT AI PERSONAS. The entire content of each afore-listed earlier-filed application is hereby incorporated by reference for all purposes.

BACKGROUND

1. Field

The present disclosure relates generally to artificial intelligence and, more specifically, to creating context-specific, versatile expert artificial intelligence (AI) personas.

2. Description of the Related Art

AI is used to automate and optimize various processes, such as data analysis, inventory management, quality control, predictive maintenance, and content generation. For instance, AI (a term used broadly to also include machine learning) systems may analyze large datasets to identify patterns and trends, which may allow for more informed decision-making regarding product development, resource allocation, and financial forecasting. Machine learning algorithms may process historical and real-time data to predict demand fluctuations, optimize supply chains, and identify potential equipment failures before they occur, potentially reducing downtime and costs. Generative artificial intelligence models, such as those for text, image, or code generation, may support creative tasks by producing design concepts, drafting documents, or generating synthetic data for training purposes. Additionally, some companies may use artificial intelligence for fraud detection, regulatory compliance, monitoring transactions and system behaviors to flag anomalies that may indicate suspicious activity, among many other use cases.

SUMMARY

The following is a non-exhaustive listing of some aspects of the present techniques. These and other aspects are described in the following disclosure.

Some aspects include a process, including: obtaining a corpus of training records; computing embedding vectors from the training records in an embedding space in which spatial proximity corresponds to similarity in style of communication of the corresponding training records; clustering the embedding vectors to determine a plurality of clusters corresponding to different styles of communication; obtaining a selection of two styles from among the plurality of styles corresponding to two respective clusters among the plurality of clusters; generating an output communication by applying the two selected styles; and storing the output communication in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
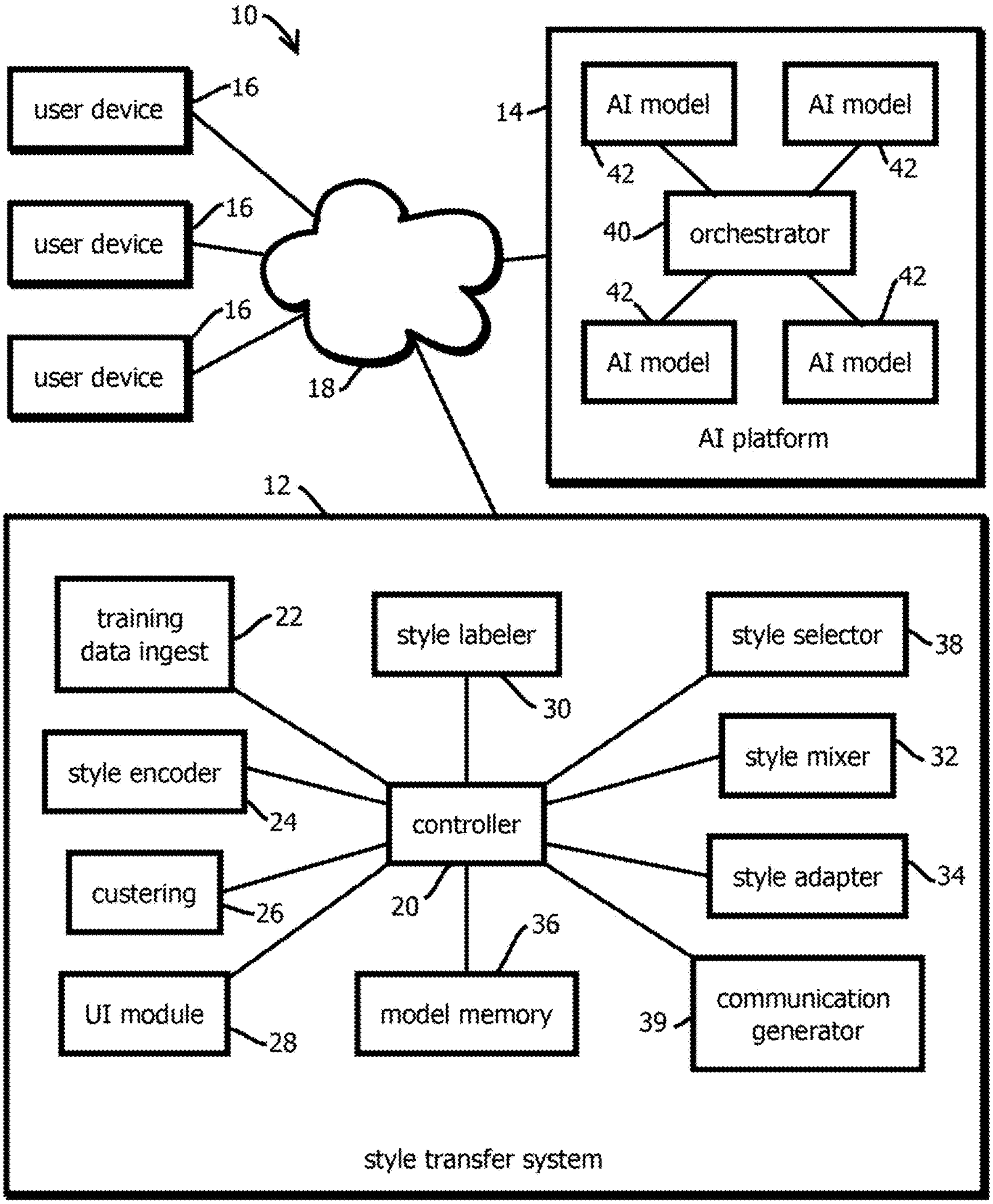
FIG. 1 illustrates an example of a style transfer system in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some artificial intelligence models implement a technique called style transfer. Style transfer in visual generative AI (e.g., in diffusion models) often involves applying the visual style of one image (like a painting) to the content of another image (like a photograph), blending them to create a unique output. This process, in some cases, uses neural networks, such as convolutional neural networks (CNNs), to separate "style" and "content" elements in images. During style transfer, in some cases, the model extracts style features such as color, texture, and brushstroke patterns from a reference style image, while preserving the layout and structure (content) of the target image. Style loss, in some cases, is quantified with a Gram matrix, which captures the correlation between different feature maps at various layers, providing a way to measure texture and color distribution, and that loss is minimized during training.

Similarly, text style transfer in natural language processing (NLP) often modifies the tone, formality, or sentiment of text while retaining its other semantic content. One approach involves attribute-controlled pretrained models, where large language models are fine-tuned on style-labeled datasets. Latent space manipulation is another approach, where sentences are encoded into vectors that can be shifted to emphasize stylistic attributes like sentiment. Conditional generative models, including Conditional Variational Autoencoders (CVAE) and Conditional GANs (cGAN), are also used for NLP, as they can be trained to produce text in a specified style by conditioning on style labels. In some approaches, reinforcement learning algorithms drive models to prioritize specific stylistic features by rewarding outputs that match the target style, maintaining meaning while adjusting tone.

Many existing style transfer algorithms cannot accommodate useful sources of training data in multiple modalities and are relatively brittle once trained or otherwise configured. Such existing approaches often do not work well with multimodal inputs, for example, spanning images, video, voice, and text. Moreover, many of the existing approaches to style transfer afford relatively limited control to the user to shape the resulting output. For example, indicating when particular variants of certain styles should be applied, either at configuration or training, or at run-time generation. Further, many existing approaches are not well suited to adapt to inputs at runtime and fail to appropriately tailor the style to the inputs at hand, making such approaches brittle and less suitable for higher-stakes, more-dynamic use cases.

Indeed, many current AI solutions often lack the ability to project personalized, stylistically unique outputs that reflect a user's (e.g., company's) individuality in varied professional contexts. Existing systems often fail to account for the nuanced personalization needs in business settings where experts need to adjust their communication tone and style across a wide spectrum of client types. These limitations hinder experts'ability to demonstrate both professional adaptability and personal branding through AI-driven content generation, thus impacting effective communication.

None of the preceding should be read to imply that any approach is disclaimed or disavowed, and this clarification should not be read to imply that any other material is disclaimed or disavowed herein where no such clarification is provided. Further, the discussion of various issues with other approaches herein should not be read to imply that embodiments are limited to systems that fully solve, or even mitigate, all of these issues or any of these issues, which is not to imply that any other description is limiting.

Some embodiments accommodate training inputs across heterogenous modalities with multi-modal embeddings created using cross-attentional networks or the like. Some embodiments cluster the resulting embedding vectors with unsupervised topological learning algorithms or hierarchical clustering to determine various clusters corresponding to different styles, or other forms of personas. Some embodiments then afford a user interface by which users may label and configure those personas to shape their application. In some embodiments, a dual-encoder model is then used for run-time personal selection and mixing, and some embodiments implement context-specific learning and evolution of personas, e.g., with reinforcement learning. A collection of styles and parameters that affect the systems propensity to apply those styles (e.g., in combination with different weights affecting the strength of each style's contribution in a given scenario) is referred to as a persona.

Some embodiments may be used in enterprise environments where showcasing individuality is helpful. Embodiments may help companies to show their own differentiation in a world that is increasingly becoming homogenized—every company has access to the same public-facing AI tools, and everyone is starting to sound the same. Some embodiments allow companies and individuals to take advantage of their uniqueness, and leverage those embodiments to differentiate from others who are just all going to sound similar, using similar tools. Some embodiments also allow people who generate more unique and differentiated content to generate more unique content, and have a multiplicative effect.

Example embodiments may mitigate some or all of these problems or other problems and have the following features.

In some embodiments, a biologically inspired adaptive framework may be executed on a computer system to allow users to create multiple personalized "AI Twins" that reflect distinct, context-specific personas. These AI Twins may be adaptable across a range of output media, including text, audio, images, gestures, video, and others, utilizing advanced learning and customization processes. In some embodiments, such a framework may incorporate features allowing dynamic style extraction, multi-modal embedding, and adaptive clustering to enable versatile persona generation and real-time adaptation. Outputs, in some embodiments, may be in the form of any of the types of inputs described. Generative models that create these outputs may be configured with the techniques described herein.

In some embodiments, a multi-layer style extraction process may be employed, utilizing transformer-based architectures, such as fine-tuned versions of models like Generative Pre-trained Transformer (GPT), Bidirectional Encoder Representations from Transformers (BERT), LLaMa, or Vision Language Models (VLM), to isolate stylistic characteristics from input sources. These sources may include user-provided text, video transcripts, or image metadata. Other examples include various channels of signals in robotics, like sensor data, control data, and the like. By leveraging natural language processing models trained on extensive, stylistically annotated datasets, the system may identify attributes such as tone, formality, linguistic complexity, and rhetorical features across multimodal data.

In some embodiments, the framework may analyze stylistic features across non-text media by generating multimodal embeddings through cross-attentional networks. Such embeddings may facilitate the alignment of stylistic elements across data types, including images, audio, and visual data, enabling the system to interpret nuanced stylistic features consistently across various mediums. For instance, in handling images or audio, cross-attentional networks may align visual or auditory cues (like those in a Mel spectrogram and text transcribed with a speech-to-text model) with textual stylistic markers, creating a coherent representation of the user's style across all formats.

Following style extraction, automated clustering and classification may be performed to group extracted styles into clusters through unsupervised topological learning algorithms or hierarchical clustering processes. These algorithms may assign stylistic tags to each cluster, forming the basis of each AI Twin's persona. As users interact with the system, it may continuously (e.g., periodically, like daily, or weekly, or in response to new input, and these example schedules may be applied in each reference to something happening continuously herein) refine these clusters, potentially affording iterative personalization that adapts over time.

This adaptive framework may facilitate a flexible application of stylistic elements across diverse media, allowing users to create dynamically responsive personas with stylistic coherence in various formats. By incorporating multi-layer, multi-modal analysis, this framework is expected to handle complex stylistic nuances, supporting consistent representation of brand voice or individual style across multiple channels and enhancing content creation across varied output formats.

In some embodiments, a tagging and prioritization mechanism may be provided (e.g., exposed via a user interface or application program interface (API)), allowing users to label and rank the stylistic elements of their AI Twins to enhance personalization. A user-driven style tagging interface may be used, helping users to manually assign intuitive tags, such as "Formal Client Report," "Casual Team Update," "Detailed," "Curt," "Aggressive," or "Non-confrontational," to various styles. Users may also rank these tags according to importance in a persona, establishing a feedback loop whereby the backend system may reweight style features in response to these preferences.

In some embodiments, a prioritization scoring system may be applied to assign weights to tags based on their frequency of use and recent relevance, which may be determined through adaptive Bayesian updating or reinforcement learning techniques. These techniques may facilitate context-sensitive prioritization of tags, allowing each AI Twin to adapt dynamically to different contexts and thereby increase the flexibility and depth of personalization available for each persona. The system may adjust the importance of tags as contextual factors shift, enhancing the ability of each AI Twin to reflect updated user preferences or situational requirements.

A dynamic re-weighting algorithm may continuously incorporate real-time updates from user interactions, adjusting the priority of tags in response to the selection patterns for various outputs. This dynamic approach to prioritization may favor frequently used or contextually significant personas, helping high-priority personas to take precedence when generating output, while deprioritizing less relevant styles.

By embedding tagging and prioritization within the learning loop, this mechanism, in some embodiments, allows for active user control over the style hierarchy, helping afford on-the-fly customization of output style for specific contexts. This flexible control may allow users, including companies, to tailor stylistic output across different regions or cultural contexts, where varying stylistic approaches may be appropriate to different business needs.

In some embodiments, a real-time persona selection and mixing mechanism may be implemented to facilitate dynamic and context-specific blending of personas for diverse output formats. In certain embodiments, contextual persona blending may be achieved through a dual-encoder model, where one encoder processes user data while the other encodes context-specific parameters. These encodings may be represented as tensors and combined using an attention mechanism to yield a blended persona. The system may apply a combination of zero-shot and few-shot learning techniques to approximate the appropriate persona based on user inputs in real time, drawing on models that have been trained or fine-tuned with the relevant persona attributes.

In some embodiments, the framework may include a modular persona selection approach, allowing users (e.g., via a user interface (UI) or application program interface (API)) to choose multiple AI Twins (or other types of personas) for particular outputs. Modular embeddings may then be employed to integrate characteristics from each selected persona. The user interface may provide intuitive controls, such as adjustable sliders, to allow users to mix and balance styles according to their preferred proportions. This interface may help users to fine-tune the blending of multiple personas, creating a customized output style that reflects the user's desired combination of traits.

In some embodiments, run-time adaptive learning may be used to generate a new, approximate persona when a novel or unclassified style is required. For example, if a user specifies a blend of "Formal" and "Friendly" for a particular scenario, a meta-learning layer may analyze context cues to generate a persona that interpolates between similar existing personas. This real-time persona adaptation may allow the model to create a new AI Twin that reflects the specified blend, dynamically adjusting embeddings to produce output that aligns with the unique stylistic requirements of the situation.

This real-time (e.g., within 5 seconds, 1 second, or 100 ms of receiving an input to which it is applied) persona blending capability may facilitate flexible, adaptive content generation across multiple forms of output. By supporting on-the-fly persona mixing, the system may allow for responsive, contextually appropriate adjustments to AI-generated content, helping it to maintain a natural, adaptive quality that responds fluidly to evolving user requirements.

In some embodiments, a context-specific learning and evolution mechanism may be employed to support the continuous adaptation and refinement of AI Twin personas based on situational feedback. In certain embodiments, the system may incorporate a memory-augmented neural network that stores "persona memories," inspired by biological memory processes. This memory module may record interactions with the user and store specific stylistic adjustments applied during these interactions. When similar situations arise, the system may retrieve relevant memories to autonomously apply previously learned adaptations, providing contextually appropriate outputs based on prior experiences.

In some embodiments, long-term persona development may be implemented through reinforcement learning embedded in the persona framework. This approach may allow each AI Twin to optimize and evolve its stylistic attributes over time. The system may gradually refine these personas by drawing insights from a variety of context-specific interactions, such as customer communications, formal presentations, or internal team updates, thereby building a sophisticated representation of user preferences that continuously adapts as interactions progress.

To handle unclassified or out-of-training-set-distribution situations, some embodiments may deploy a meta-learning layer capable of generating a new AI Twin that is responsive to unique contextual factors. By identifying contextual gaps and inferring stylistic cues from these, the system may synthesize a new persona that aligns with unfamiliar circumstances. This self-adapting mechanism, in some embodiments, functions similarly to biological evolution, helping the system to respond appropriately in unfamiliar contexts by adjusting its stylistic responses based on inferred cues.

This adaptive framework, in some embodiments, may help an AI Twin (or other personas) to develop enhanced situational awareness over time. The evolving nature of these personas is expected to yield outputs that are progressively refined and contextually aligned with the user's evolving needs, delivering an increasingly personalized experience that adapts dynamically to changing contexts.

In some embodiments, resilience and experience accumulation over time may be implemented to support AI Twins (or other personas) in adapting and improving through repeated interactions. An experience-driven adaptation mechanism, in some embodiments, may be used, whereby each AI Twin includes an experience tracker that records contexts of interactions, styles used, and user feedback. This data, in some embodiments, may be input into a reinforcement learning loop, where context-specific memory embeddings guide future responses. For instance, if a particular tone proves effective with a specific client type, the system may prioritize this tone in similar future scenarios, reinforcing successful communication patterns and adapting less effective ones.

Some embodiments may further include feedback-informed behavior refinement, leveraging user feedback on output effectiveness to enhance response strategies. In this process, Q-learning (a form of reinforcement learning) may be applied, in some embodiments, to adjust response characteristics, such as tone or complexity. Positive feedback may strengthen the associated stylistic traits, while negative feedback may prompt adaptive learning, allowing the system to modify its approach and avoid repeating less effective styles in future interactions.

In some embodiments, dynamic situational recall may be incorporated. This memory-based recall mechanism, in some embodiments, may allow an AI Twin (or other personas) to retrieve relevant prior interactions when encountering similar contexts, helping afford rapid adaptation without needing to relearn familiar scenarios. This situational recall is expected to improve the AI Twin's resilience, fostering a sense of familiarity with recurring communication challenges.

As the AI Twin engages in new or increasingly complex interactions, it may undergo progressive persona evolution, continuously refining its stylistic and behavioral nuances. This memory-augmented development allows each AI Twin to grow more precise and resilient over time, yielding outputs with greater contextual accuracy and sophistication as interactions accumulate.

This approach in some embodiments, which builds resilience through memory-based learning, may help each AI Twin (or other personas0 to adapt, refine, and expand its stylistic range across interactions. By affording continuous experience-driven adaptation, in some embodiments, AI Twins may become highly responsive, capable of achieving a natural progression of expertise suitable for varied business situations. This continuous learning process is expected to support users in deploying highly refined, reliable AI Twins that respond consistently and intelligently across a broad spectrum of scenarios.

Other variations may include the following:

In some embodiments, situational snapshot persona creation may be implemented, wherein the system generates temporary personas based on real-time situational analysis rather than relying solely on pre-existing AI Twins. For instance, in a high-priority business update, the system may rapidly analyze the current context to create a persona optimized for urgency and clarity, which may suit high-stakes communication. Upon completion of the task, the system may archive or delete the snapshot persona to maintain efficiency. This approach may be particularly suited for environments requiring fast adaptability to evolving communication needs, such as crisis management or public relations.

In another embodiment, a hybrid manual-automatic persona creation process may allow users to manually input stylistic preferences, such as tone, formality, or verbosity, which are then saved as distinct personas. This semi-automated approach, in some embodiments, permits users greater control over AI Twin creation by enabling direct input of specific traits. While it may reduce the degree of automation, this approach may offer flexibility for users with specialized style requirements, such as in highly regulated industries where precise control over language is necessary.

In some implementations, AI Twin "style libraries" may be created based on industry archetypes. The system may access pre-built style libraries containing sets of industry-specific personas, such as "Legal Compliance," "Technical Report," or "Executive Summary." These personas may be pre-configured with industry-aligned stylistic traits but remain customizable. Such libraries may be beneficial for users who need rapid persona setup without extensive personalization data and may support standardized communications in fields such as legal or medical industries, where particular tone conventions are widely recognized and expected.

In certain embodiments, predefined persona mixes may be created for common scenarios, facilitating persona mixing with preset proportions. Instead of allowing full real-time adjustments, this approach may offer predefined mixes for frequently encountered contexts, such as "Sales Pitch+Formal Report" or "Technical Brief+Executive Overview." The system may employ a semi-rules-based or automated mechanism to select and blend personas according to these templates, promoting consistency across specific interactions like client updates or technical support responses. This approach may be particularly suited for organizations prioritizing uniformity in communications and may reduce user effort by providing readily applicable, scenario-specific styles.

In a further variation, feedback-driven persona evolution may be limited to on-demand activation, wherein learning based on user feedback occurs only when explicitly prompted. In this controlled process, users may trigger learning cycles selectively when a persona requires adjustment, allowing the AI Twin to update its style based on specific interactions. This approach may be advantageous for users who prefer stable personas with minimal unprompted adaptation, and may suit environments such as legal or compliance fields, where consistency is helpful. Additionally, this feature may trigger an alert to the user if their communication style diverges from previous patterns in similar settings.

In some embodiments, context-aware AI Twin selection may be achieved through environmental cues, helping the system to automatically select appropriate personas based on contextual signals. For instance, if an email subject line includes "Client Update," the system may identify this cue and activate a pre-configured client-friendly persona. This approach may use classifiers to infer context from environmental data, enabling hands-off persona selection that may suit time-sensitive, high-volume communications, such as those in customer support.

In some embodiments, the present techniques may be integrated with systems and processes described in other patent applications by the applicant filed on the same day as this filing. Some embodiments may render model outputs explainable with the techniques described in the U.S. patent application Ser. No. 19/383,535, titled ROBUST EXPLAINABLE ARTIFICIAL INTELLIGENCE. Some embodiments may provide a user interface with the techniques described in the U.S. patent application Ser. No. 19/383,537, titled HUMAN-AI CO-CREATION SYSTEM. The entire content of each afore-mentioned patent filing in this paragraph is hereby incorporated by reference.

It should be assumed that the results described herein are generally prophetic, rather that describing the result of actual tests performed.

In some embodiments, the above architecture may be implemented on one or more computing devices forming a computing system, e.g., a client-server architecture. Having memory storing instructions that when executed, implement the described functionality. In some embodiments, users may access this computing system via a network such as the internet. Remotely, using their own computing devices, which may be personal computers, desktop computers, wearable computing devices, laptop computers, and the like. In some embodiments, the described system may be implemented in a cloud architecture, in a hybrid cloud architecture, and on-premises architecture, or in other architectures. In some embodiments, an orchestrator module may coordinate the various models in the execution path, and a view generator may generate the user interfaces, which may be presented client-side in a special purpose application or in a web browser.

FIG. 1 illustrates an example of a computing environment 10 in accordance with some embodiments of the present techniques. In some embodiments, an illustrated style transfer system 12 may operate in a networked computing environment to process inputs and produce communications according to selected styles. As described in more detail below, the style transfer system 12 may execute on one or more computer systems and may exchange data with an artificial intelligence (AI) platform 14 to request inference and training services. The AI platform 14 may expose interfaces through which the style transfer system 12 may submit requests for model evaluation, receive vectors or generated content, and store or retrieve intermediate artifacts. The style transfer system 12 and the AI platform 14 may communicate over one or more programmatic interfaces and may coordinate state using messages or remote procedure calls in either direction, in some embodiments.

In some embodiments, as expanded upon below, one or more user devices 16 may communicate with the style transfer system 12 over the internet 18 to submit prompts, style selections, and other parameters, and may receive generated communications and related metadata. The user devices 16 may present a graphical user interface through which a user may supply inputs and review outputs, while the internet 18 may provide transport for request and response messages, streaming data, and status updates between the user devices 16, the style transfer system 12, and the AI platform 14.

In some embodiments, a style may comprise a specification that may include, for example, values that affect one or more of the following in an output communication: tone (for example, calm, enthusiastic, neutral, empathetic, or authoritative), register and formality level, preferred word choice including domain-specific vocabulary and avoidance lists, sentence length targets expressed as distributions, syntactic complexity ranges such as clause depth and coordination frequency, voice preferences such as rates of active versus passive constructions, tense and aspect usage, modality patterns including verbs that may soften or strengthen commitments, propensity to ask questions or issue directives, politeness strategies including greetings, hedges, boosters, apologies, and courtesy closings, sentiment propensities across positive, negative, and neutral categories with intensity bounds, paragraph structure including target paragraph length and number of sentences per paragraph, discourse organization patterns such as placement of thesis sentences, transitions, and summaries, rhetorical device allowances including use of analogies, examples, enumerations written in prose, or rhetorical questions, punctuation preferences including use of semicolons, colons, em dashes, parentheses, Oxford comma selection, and exclamation mark caps, capitalization and casing conventions for headings and proper nouns, contraction usage policies, numerical presentation such as numerals versus words and rounding rules, date and time formatting conventions, spelling variants such as American or British orthography, hyperlink density and placement policies, citation phrasing and footnote avoidance, inclusivity and accessibility constraints such as person-first phrasing and plain-language readability bands, emoji or emoticon allowance and maximum rate, typography-like markers in plain text such as quotation style and emphasis markers, lexical diversity bounds and repetition penalties, taboo or sensitive-topic filters, call-to-action frequency and placement, template selections for salutations and sign-offs, audience-specific variants that may map roles to vocabulary substitutions, and, in some embodiments, cross-modal cues mapped into text such as prosodic directives for downstream speech synthesis or references to visual themes that may align with color or layout descriptors captured during labeling.

The computing environment 10 may operate entirely within an enterprise network, span a mix of on-premises and cloud segments, or be fully public. Network 18 may be private and secured through identity controls, network segmentation, private routing, and encrypted transport or may be (or may include) the public internet. The style transfer system 12 and the AI platform 14 may access non-public sources inside the enterprise while honoring data residency, access policies, and audit requirements. In some deployments, components may reside on dedicated subnets and use private endpoints or peering links so traffic does not traverse the public internet. The system may determine where to execute processing based on policy and may cause records of access and lineage to be written for later review.

Multi-tenant versions of the AI platform 14 or the style transfer system 12 may serve more than one business unit or customer while maintaining isolation. The platform may obtain requests from different tenants, determine tenant context, and enforce data and model separation at runtime. Administrative functions may allow a tenant to manage users, groups, and integrations without exposing resources of other tenants. In hybrid deployments, some tenants may keep sensitive workloads inside the enterprise network while other tenants access hosted services, with controls that limit cross-tenant movement of data and models.

During operation, user devices 16 may communicate over a network 18. The platform 14 may obtain content from the enterprise data repository 15, access internal or external models for analysis and generation, and cause user interfaces to be delivered to user devices 16. In some cases, the system may determine where to execute processing based on policy or access constraints and may maintain session state so changes appear without interrupting ongoing use.

In some embodiments, a user device 16 may be a general-purpose computing platform that may run an operating system such as Windows™, macOS™, Linux™, iOS™, or Android™ and may execute a client application that may prepare, transmit, and receive serialized request and response messages destined for an AI platform 14 over the internet 18, in some cases, mediated by system 12. A client application (e.g., a browser or a native application) on the user device 16 may accept user input, may normalize text using configured tokenization and Unicode normalization, and may assemble a request object that may include a prompt string, model selection hints, client-side timestamps, and an idempotency key. The user device 16 may open a Transport Layer Security session to the AI platform 14 or system 12 via the internet 18, may attach authentication material such as bearer tokens or mutual Transport Layer Security client certificates, and may send the request over Hypertext Transfer Protocol. The user device 16 may maintain a queue for pending requests and may implement an asynchronous loop that may dequeue the next request, check network status, sign a payload using a device key stored in a secure element such as Secure Enclave™ or Android™ Keystore, transmit the payload to the AI platform 14, and store a response in non-volatile storage on success. On retryable errors, the loop may increment an attempt counter, requeue the request, and back off using a randomized delay. The user device 16 may, in some embodiments, cache context artifacts and evaluation datasets subject to a least-recently-used eviction policy and may record a provenance record containing request identifiers, hash digests of payload fragments, and server-supplied audit metadata associated with responses received from the AI platform 14 or system 12.

In some embodiments, multiple user devices 16 (e.g., more than 10, more than 100, or more than 10,000) may operate within an enterprise deployment and may be geographically remote across regions while accessing the AI platform 14 or system 12 through the internet 18. Each user device 16 may register with an identity provider, may fetch configuration profiles from a device management service, and may synchronize policy that may specify permitted endpoints reachable over the internet 18, storage encryption requirements, and certificate pin sets for connections to the AI platform 14 or system 12. A user device 16 may select among service endpoints of the AI platform 14 or system 12 by issuing health probes, measuring round-trip time, and choosing a preferred endpoint for a session while maintaining a fallback list. The user device 16 may compress payloads using a streaming compressor and may segment large uploads into fixed-size chunks that may be reassembled server-side using chunk indices and a session identifier. Administrative controls for the user devices 16 may include a signed command channel that may trigger policy refresh, cache invalidation, or client updates. The client application on a user device 16 may verify command signatures against a pinned public key and may reject out-of-order commands based on monotonically increasing sequence numbers. User devices 16 may be used to request the generation of, provide feedback to edit, and to use software applications automatically (e.g., with no or limited human intervention) generated with the platform 14 or system 12.

In some embodiments, as described in more detail below, within the system 12, a controller 20 may coordinate operation of the style transfer system 12 by receiving requests, scheduling processing across modules, and maintaining execution state associated with active prompts and records. A training data ingest module 22 may accept data sets from one or more sources and may prepare corresponding metadata for later processing. A style encoder 24 may accept prepared inputs and may produce vectors or other structured representations suitable for later grouping or selection. A cluster module 26 may apply grouping logic to such representations to maintain associations that may be referenced by other modules without requiring those modules to perform grouping. A UI module 28 may provide input and output views for users and programmatic clients and may format messages so that other modules can parse parameters and return results.

In some embodiments, and again elaborated upon below, within system 12, a style labeler 30 may assign labels or tags to grouped or ungrouped representations to allow later filtering or selection. A style mixer 32 may accept one or more selected styles and corresponding weights for a given communication and may produce a composite specification that other modules may apply. A style adapter 34 may convert style specifications into parameters or tokens consumable by downstream generators and may maintain mappings for multiple target models. A model memory 36 may store data accessed when generating certain communications. A style selector 38 may compute or retrieve a recommended set of styles for a given prompt or context. In some embodiments, a communication generator 39 may accept a prompt, a style specification supplied by the style mixer 32 or the style selector 38, and parameters supplied by the controller 20, and may produce output communications according to those inputs. The communication generator 39 may return generated sequences and associated metadata to the controller 20 for further routing to the UI module 28 or to external systems. A communication is said to be generated by the style transfer system 12 even if that generation involves use of an AI platform 14 hosted by a third party as long as the style transfer system 12 applies a selected style. In other words, the act of generating can be performed by either actually generating the communication oneself or calling another system that returns the generated communication.

In some embodiments the controller 20 may coordinate the operation of the other illustrated components. In some cases, the controller 20 may execute a process described below with reference to FIG. 2. In some embodiments, a controller 20 may coordinate operation of components of the style transfer system 12 by receiving requests from a UI module 28 or programmatic clients, and parsing parameters. The controller 20 may assign a workflow identifier, create a directed set of tasks referencing the training data ingest module 22, a style encoder 24, a cluster module 26, a style labeler 30, a style mixer 32, a style adapter 34, a style selector 38, and a communication generator 39, and may enqueue those tasks on one or more queues. The controller 20 may allocate tasks to components according to a scheduling policy.

In some embodiments, the controller 20 may perform data routing between components by writing intermediate results to memory and by issuing references to those results to downstream components, or by sending those results directly. The controller 20 may, for example, dispatch an ingest task to the training data ingest module 22 and, upon receiving a completion signal, may post a style encoding task to the style encoder 24 with pointers to prepared records. When the style encoder 24 writes embedding vectors to memory, the controller 20 may trigger the cluster module 26 to compute group assignments and then may request the style labeler 30 to attach labels to the resulting groups.

In some embodiments, the controller 20 may coordinate generation by obtaining (e.g., in response to receiving) a prompt, before selecting a style and providing it to the communication generator 39 with references to the prompt and the style parameters. The controller 20 may monitor execution using heartbeat signals, may reissue tasks upon timeout according to the retry budget, and may terminate or supersede tasks when newer inputs arrive under the same workflow identifier. The controller 20 may maintain audit records of messages exchanged among the components and may tag those records with version identifiers of models in the AI platform 14. The controller 20 may publish progress events to the UI module 28 and may apply backpressure by deferring task issuance when resource thresholds are reached.

In some embodiments, a training data ingest module 22 may receive, normalize, and persist corpora of training records that may be used by downstream components of the style transfer system 12. The training data ingest module 22 may accept records in multiple modalities including natural language text, audio, video, and images, and may write normalized representations and associated metadata to memory together with provenance identifiers. The training data ingest module 22 may expose programmatic interfaces through which a controller 20 may submit source specifications, including source addresses, authentication artifacts, date ranges, user or group scopes, and audience filters, and may schedule acquisition jobs that read from enterprise repositories, message archives, document stores, ticketing systems, or communication platforms. The training data ingest module 22 may apply schema mapping to convert heterogeneous record formats into a common representation that records a content payload, a modality identifier, timestamps, authorship identifiers, intended audience descriptors, and any privacy or access-control labels to be honored by downstream processing.

In some embodiments, a training corpus may include Some embodiments may crawl an enterprise data repository, applying those inclusion rules and collecting data for training. a set of records selected for training according to one or more inclusion rules. The training data ingest module 22 may accept a corpus definition that identifies members of a group of model employees, a particular employee, a subset of communications associated with a particular class of audience members such as customers, partners, managers, or new hires, or communications limited to a specified channel such as support tickets or incident reports. The training data ingest module 22 may segment long-form documents into passages according to paragraph boundaries, headings, semantic boundaries, or rolling windows, and may segment audio according to silence detection or a fixed duration window. In some cases, corresponding video frames or transcripts may be aligned to each segment. The training data ingest module 22 may record, for each segment, a corpus identifier, a sequence number, and a linkage to the parent source artifact so that downstream modules may trace each training example to its origin.

In some embodiments, the training data ingest module 22 may perform preprocessing steps that prepare records for downstream processing. The training data ingest module 22 may remove markup and non-content artifacts, may normalize whitespace and punctuation, may standardize encodings, may detect and balance languages, and may redact fields that match patterns indicative of personally identifiable information. The training data ingest module 22 may apply transcription to audio or video using an automatic speech recognition model and may attach diarization markers and confidence measures. The training data ingest module 22 may apply optical character recognition to images that contain text. The training data ingest module 22 may compute lightweight fingerprints for deduplication, such as content hashes, and may also compute approximate fingerprints such as character n-gram sketches. In some cases, near-duplicate clusters may be reduced to a representative record, e.g., by deleting all but one in the cluster. The training data ingest module 22 may maintain a log of all transformations applied so that the controller 20 may request replay or rollback.

In some embodiments, the training data ingest module 22 may curate a corpus by applying automated selection procedures. The training data ingest module 22 may compute heuristics including message length, sentence-length distribution, lexical diversity, part-of-speech distribution, and punctuation patterns, and may filter records that deviate from configuration ranges. The training data ingest module 22 may compute quality scores based on downstream feedback signals that are written back into the model memory 36, including user reactions, A/B test outcomes, or error rates; records with higher scores may be sampled at higher rates. The training data ingest module 22 may request scores from a large language model configured to rate records according to criteria supplied by a style labeler 30, such as clarity, formality, or consistency with a style rubric, and may accept or reject records based on thresholds. In some embodiments, the training data ingest module 22 may request pairwise preference labels and compute an ordering that may be used to sample preferred records more frequently. The training data ingest module 22 may expose a review interface through a user interface (UI) module 28 by which a curator may approve, annotate, or exclude records; annotations may include audience tags, scenario tags, or style hints that a style labeler 30 may later use.

In some embodiments, the training data ingest module 22 may construct corpora that are machine generated. The training data ingest module 22 may request a communication generator 39 to synthesize seed records according to prompts and constraints, may record such records in a distinct corpus partition, and may mix such records with human-origin records at configured ratios. The training data ingest module 22 may request paraphrases of existing records conditioned on maintaining specified surface features such as sentence length distributions and punctuation frequencies, and may verify constraints by recomputing features on the paraphrases. The training data ingest module 22 may sample negative examples that are expected to challenge a style encoder 24, such as records with the same topic but different style, and may label these examples for later use by a cluster module 26 during evaluation. The training data ingest module 22 may record generator settings and seeds as part of provenance so that the controller 20 may regenerate the same synthetic corpus version if needed.

In some embodiments, the training data ingest module 22 may apply selection logic that targets specific audience subsets. The training data ingest module 22 may ingest records addressed to particular roles or departments and may compute audience embeddings or simpler audience descriptors based on header fields, distribution lists, topics, whether communications resulted in desired outcomes (like a closed sale or resolved dispute), or metadata provided by directory services. The training data ingest module 22 may partition corpora by audience so that a style selector 38 may later select styles conditioned on a prompt context that includes an audience descriptor. The training data ingest module 22 may maintain balanced sampling across partitions such that each partition contributes at least a threshold proportion of records to a training batch and may downsample partitions that exceed configured limits.

In some embodiments, the training data ingest module 22 may obtain records from connected services and repositories. The training data ingest module 22 may read from enterprise mail services such as Gmail™ or Microsoft Outlook™, collaboration platforms such as Slack™, document repositories such as Google Drive™ or Microsoft SharePoint™, ticketing systems, and code review systems. The training data ingest module 22 may apply per-source adapters that paginate, rate limit, and retry requests according to service quotas. The training data ingest module 22 may honor access scopes provided by the controller 20 and may record access tokens and consents separately from content so that a change in access policy may be applied without rewriting stored content. The training data ingest module 22 may store a mapping between source identifiers and anonymized internal identifiers and may restrict downstream modules from resolving such mappings except through the controller 20 according to policy.

In some embodiments, the training data ingest module 22 may produce batches for training that respect configuration constraints. The training data ingest module 22 may assemble batches that contain a specified mixture of modalities, audience partitions, authors, or time periods, and may enforce constraints such as maximum tokens per batch. The training data ingest module 22 may stratify data splits for training, validation, and testing so that distributions of selected features are within configured tolerances across splits. The training data ingest module 22 may write batch manifests to the model memory 36 as lists of record identifiers and may record a checksum so that a style encoder 24 may verify batch integrity before processing.

In some embodiments, the training data ingest module 22 may expose lifecycle and versioning behavior. The training data ingest module 22 may assign a version identifier to each corpus and may record the set of source snapshots, preprocessing parameters, curation rules, and selection thresholds that produced that version. The training data ingest module 22 may compact older versions by retaining only manifests and diffs and may retain full content for the most recent versions; the controller 20 may configure retention windows. The training data ingest module 22 may emit events when a corpus version becomes available and may permit the controller 20 to pin a style encoder 24 or a cluster module 26 to a specific corpus version for reproducible experiments. The training data ingest module 22 may expose metrics such as ingestion latency, record acceptance rates, deduplication rates, language distribution, and style rubric acceptance rates; such metrics may be recorded in memory and may be queried by the controller 20 or displayed through the UI module 28.

In some embodiments, the training data ingest module 22 may interoperate with the style labeler 30 during ingestion. The training data ingest module 22 may request preliminary style tags from the style labeler 30 for a sample of records, may record such tags as weak labels, and may feed such labels back into curation rules to preferentially include or exclude records that match or conflict with a desired profile. The training data ingest module 22 may request updates to weak labels after a cluster module 26 has produced cluster assignments so that labels reflect cluster-level properties as well as record-level properties. The training data ingest module 22 may, in some embodiments, request a style mixer 32 to construct style mixtures for synthetic augmentation and may store the resulting records as a separate corpus partition with mixture weights recorded in metadata so that downstream training procedures may condition on those weights.

In some embodiments, the training data may be multimodal and may include natural language text documents, images, videos, and audio, and may further include metadata describing authorship, time of creation, intended audience, and access controls. The training data ingest module 22 may accept records that lack labels when received and may write each record with a modality identifier and a normalized payload to the model memory 36. For text, the training data ingest module 22 may store a Unicode string together with language tags, token counts, and paragraph offsets. For images, the training data ingest module 22 may store an image raster or a reference to an object in external storage together with height, width, color space, and per-image hashes. For audio, the training data ingest module 22 may store a waveform or compressed stream together with sample rate, channel count, and segment boundaries. For video, the training data ingest module 22 may store a container reference together with frame rate, keyframe indices, and a mapping from time offsets to aligned text derived from automatic speech recognition when requested. The training data ingest module 22 may record, for each stored item, a source identifier, a corpus identifier, and a stable record identifier that downstream components, including a style encoder 24 and a cluster module 26, may reference.

In some embodiments, the training data may include unstructured content and may arrive without labels, and the training data ingest module 22 may perform structure extraction to facilitate later processing while preserving the original payload. For text, the training data ingest module 22 may apply sentence segmentation, part-of-speech tagging, and paragraph boundary detection and may store offsets that allow a downstream component to reconstruct spans. For images and video frames, the training data ingest module 22 may compute perceptual hashes, salient region masks, and basic captions using an image-to-text model and may store those artifacts as auxiliary fields. For audio and video, the training data ingest module 22 may apply automatic speech recognition to compute transcripts, may apply diarization to assign speaker turn boundaries, and may store confidence scores per token. When labels are absent, the training data ingest module 22 may attach placeholder fields indicating unknown labels and may optionally request weak labels from a style labeler 30 or a large language model configured for rating so that later training procedures may read either unlabeled records or weakly labeled records from the same corpus.

In some embodiments, audio may be processed to infer a speaking style independent of lexical content by deriving prosodic and timbral features and mapping those features to a style representation that a text pipeline may later reference. A preprocessing stage may segment the waveform into short analysis frames and may compute features that may include fundamental frequency contours, pitch range, pitch slope statistics, energy envelope and dynamics, speaking rate estimated from voiced-unvoiced transitions, pause duration histograms, spectral tilt, spectral centroid trajectories, formant bandwidth trends, and voice-quality measures such as jitter and shimmer, and in some cases, embeddings from a neural acoustic front end may also be computed. Transcripts from speech-to-text algorithms may be annotated with the corresponding characterizations of audio. In some cases, these characterizations of audio may be included in output-generated communications for use in text-to-speech models to generate audio consistent with a selected style.

In some embodiments, a style encoder 24 may accept training records from multiple modalities and may compute embedding vectors for such records in a shared embedding space in which proximity may correspond to stylistic similarity among the corresponding records. The style encoder 24 may receive, for example, a text segment and an image reference from a model memory 36 and may return, for each record, a fixed-length vector in a share embedding space produced by one or more neural network encoders followed by projection layers and normalization. The style encoder 24 may tokenize text into subword tokens, may (if not done on ingest) transform audio into frames or frequency-domain features, and may map images into patch sequences or convolutional feature maps, and may produce per-token or per-frame hidden states that a pooling operation may reduce to a single vector per record. The style encoder 24 may write intermediate activations and final vectors back to memory with identifiers supplied by a controller 20 so that downstream components may reference the vectors without re-encoding.

In some embodiments, the style encoder 24 may implement cross-attention fusion in which hidden states from one modality may attend to hidden states from another modality before projection into the shared embedding space. The style encoder 24 may first compute text hidden states using a stack of transformer layers with self-attention over token embeddings and may compute image hidden states (e.g., in intermediate embedding spaces specific to each modality) using a stack of transformer or convolutional layers over image patches. The style encoder 24 may then apply cross-attention layers in which queries derived from the text hidden states may attend to keys and values derived from the image hidden states, and may also apply a symmetric pass in which queries derived from the image hidden states may attend to keys and values derived from the text hidden states. The style encoder 24 may concatenate or sum the resulting cross-attended states with the original self-attended states, may apply feed-forward layers with residual connections, and may pool the fused sequence with an attention pooling operation that may weight tokens or patches according to learned scores. The style encoder 24 may apply a projection head that may consist of one or more linear layers with a nonlinearity and may normalize the output to unit length to obtain an embedding vector that may be compared across modalities using cosine similarity, Euclidian distance, Minkowski distance, or the like.

In some embodiments, the style encoder 24 may implement a dual-encoder in which each modality may be encoded by a dedicated encoder without token-level interaction during the forward pass, and the outputs may be mapped into the shared embedding space by respective projection heads. The style encoder 24 may, as an example, apply a text encoder to produce a text vector and an image encoder to produce an image vector, may apply modality-specific projection layers to map both vectors into the same dimensionality, and may normalize both vectors so that similarity computations may be stable across batches. The style encoder 24 may maintain encoder weights that may be updated by backpropagation from a loss computed on the similarity of pairs of vectors drawn from records that may share or may not share a style label, and may optionally maintain a momentum copy of one encoder to stabilize training across large batches. The style encoder 24 may support additional encoders for audio and video that may follow the same pattern of independent encoding and shared-space projection.

In some embodiments, the style encoder 24 may be trained with a contrastive objective that may increase similarity between vectors of records that share a style label and may decrease similarity otherwise. The style encoder 24 may form mini-batches that may include, for each anchor record, at least one positive record that shares a style label and at least one negative record that does not share the label, and may compute, for the anchor, a similarity score with respect to the positive and to the negatives. The style encoder 24 may compute, for each pair, a loss term that may decrease when the positive similarity exceeds the negative similarities by a margin, and may aggregate such terms across the batch. The style encoder 24 may apply temperature scaling to the similarity scores, may maintain queues of previously encoded vectors to enlarge the set of negatives beyond the current batch, and may allow multiple positives per anchor when several records may share the same style label. The style encoder 24 may further apply a supervised contrastive variant in which all records that share the anchor's label in the batch may be treated as positives, and records with other labels may be treated as negatives.

In some embodiments, the style encoder 24 may incorporate auxiliary objectives to influence the shared embedding space toward stylistic properties rather than topic or content. The style encoder 24 may attach a classifier head that may predict a style label from the embedding vector, and may include a cross-entropy term in the training loss so that vectors may be separable by label. The style encoder 24 may attach an adversarial head that may attempt to predict a modality identifier from the embedding, and may apply a gradient reversal layer so that the encoder may learn embeddings from which the modality may be harder to predict, thereby encouraging modality-invariant representations of style. The style encoder 24 may apply a clustering-consistency term in which embeddings assigned to the same cluster by a cluster module 26 may be pulled toward a learned prototype for that cluster, and embeddings assigned to different clusters may be separated by at least a margin. The style encoder 24 may include a variance and covariance regularization term that may maintain a spread of embeddings within each cluster while discouraging collapse along any single dimension.

In some embodiments, the style encoder 24 may incorporate cross-attention during training even when a dual-encoder inference path may be used. The style encoder 24 may, for batches with paired records from different modalities, compute fused representations with cross-attention and may align the dual-encoder outputs toward the fused representation by applying a distillation loss that may penalize the distance between the dual-encoder vector and the fused vector. The style encoder 24 may, for unpaired records, generate pseudo-pairs by sampling a record from another modality that may be assigned to the same cluster by the cluster module 26 or may share a weak label provided by a style labeler 30, and may treat such pseudo-pairs as positives with a reduced weight. The style encoder 24 may, in some embodiments, mask content-bearing tokens or regions during cross-attention so that attention weights may be estimated primarily from stylistic cues such as sentence cadence, punctuation patterns, color palettes, or frequency envelopes.

In some embodiments, the style encoder 24 may rely on data transformations that may preserve stylistic attributes while altering content to provide additional positives during training. The style encoder 24 may paraphrase text while preserving sentence-length distributions and punctuation frequencies, may apply audio time-stretching and loudness normalization that may maintain prosodic patterns, and may apply image color remapping and cropping that may preserve palette and layout density. The style encoder 24 may pair an original record with its transformed counterpart as a positive pair, and may downweight or exclude transformations that may change style-indicative measurements recorded during ingestion. The style encoder 24 may record transformation identifiers in memory so that a controller 20 may reconstruct the training batch for evaluation or audit.

In some embodiments, the style encoder 24 may implement alternatives to cross-attention and dual encoders for producing vectors in the shared embedding space. The style encoder 24 may learn a set of style prototypes that may be represented as vectors and may compute, for each record, a mixture of prototypes produced by an attention mechanism over the prototypes with keys and queries derived from the record's hidden states, and may use the mixture as the embedding vector. The style encoder 24 may compute a graph over records based on approximate nearest neighbors and may apply a message passing step in which each record's hidden state may be updated by aggregating messages from neighbors before projection. The style encoder 24 may apply a canonical-correlation-inspired projection by learning linear projections for each modality that may maximize correlation between projected vectors of paired records while penalizing projections that may be predictive of topic words or named entities. The style encoder 24 may apply adapters in the encoders, such as low-rank adapters inserted into transformer layers, and may train only the adapters and projection heads while keeping base encoder weights fixed.

In some embodiments, the style encoder 24 may produce multiple vectors per record to capture different stylistic facets and may combine such vectors into a single embedding vector by a learned linear combination or a gated combination. The style encoder 24 may, for example, produce a vector that may emphasize syntax from early transformer layers and a vector that may emphasize sentence rhythm from later layers, and may select weights for the combination according to a style rubric provided by the style labeler 30. The style encoder 24 may record facet vectors alongside the combined vector so that downstream modules may choose to operate on the combined vector or on a specific facet. The style encoder 24 may, in some embodiments, generate per-token or per-region style saliency scores and may store such scores for inspection and later refinement of attention masks.

In some embodiments, the style encoder 24 may support inference for records from any supported modality without requiring paired inputs at runtime. The style encoder 24 may, upon receiving a single text record, compute the text embedding and may return the vector for comparison against vectors produced from images or audio during prior processing. The style encoder 24 may, upon receiving an image without associated text, compute the image embedding and may return the vector for use by a style selector 38 in matching a requested style. The style encoder 24 may accept batch requests and may process them on accelerators through the AI platform 14, may shard long sequences across devices, and may stream intermediate activations to reduce memory footprint when the controller 20 requests large batch sizes. The style encoder 24 may expose versioned endpoints so that experiments may proceed with distinct parameter sets while downstream modules may pin to a specific version.

In some embodiments, the style encoder 24 may maintain calibration procedures for the shared embedding space across modalities. The style encoder 24 may periodically evaluate inter-modality similarity distributions on a held-out set and may adjust scale parameters in the projection heads to align similarity score ranges, and may update temperature parameters used in similarity computations so that selection thresholds may remain stable over time. The style encoder 24 may also maintain per-modality normalization statistics for tokenization and feature extraction, and may re-estimate such statistics when a new corpus version becomes available from a training data ingest module 22. The style encoder 24 may emit metrics, including average positive and negative similarities, style classification accuracy of the auxiliary head, and modality prediction accuracy of the adversarial head, and may record such metrics in memory for retrieval by the controller 20 and display by a user interface (UI) module 28.

In some embodiments, an embedding space may be a vector space in which each training record may be represented by a fixed-length numeric vector that a style encoder 24 may compute. The embedding space may be relatively high dimensional, such as 128 256, 512, 768, 1024, or 2048 or more or fewer dimensions. The dimensionality may be lower than the raw representation of the corresponding input records, which for text may include thousands of tokens and for images or audio may include hundreds of thousands to millions of pixel or sample values. A projection head of the style encoder 24 may map hidden states derived from text, image, audio, or video encoders into the embedding space and may normalize the vectors so that distances or similarities may be computed consistently across modalities.

The style encoder 24 may be used when training the system 12 for a new style, but the style encoder itself may undergo training prior to that to learn to operate as an encoder in this manner. In some embodiments, proximity in the embedding space may be correlated with similarity in style because the encoders and projection heads may be trained with objectives that adjust parameters to bring vectors of records sharing a style label closer together and to push apart vectors of records with different labels. A training procedure may assemble batches that include positives and negatives for each anchor record and may compute a loss that decreases as a margin between positive and negative similarities increases. Temperature parameters may control the sharpness of this separation during optimization. A supervised contrastive variant may treat all records in the batch that share the anchor's style label as positives. A clustering-consistency objective may, in some embodiments, pull vectors toward a prototype for a cluster computed by the cluster module 26 and may separate vectors from prototypes of other clusters by at least a margin, where the prototypes may be updated periodically from recent vectors. An auxiliary classifier head may predict style labels from embedding vectors, and an adversarial head with gradient reversal may attempt to predict modality so that the encoder may learn to reduce modality cues in the vectors, which may further align stylistic properties across text, image, audio, and video.

In some embodiments, different model architectures may be trained to produce vectors in the same embedding space. A cross-attention fusion path may accept paired or pseudo-paired records from two modalities, may compute token or patch hidden states, may apply attention from one modality to the other, and may pool fused states into a vector that a projection head maps into the embedding space. A distillation term may guide a dual-encoder path to match the fused vector when cross-modal inputs are present. A dual-encoder path may maintain separate encoders per modality, may project each modality's output into the shared space, and may align the outputs by contrastive loss computed over cross-modal pairs and over intra-modal positives derived from records with the same style label. Alternatives may include learning a set of style prototypes that the model may attend over to produce a mixture vector, or applying message passing over a graph whose edges may connect nearby vectors so that local neighborhoods may adjust toward style-coherent regions before projection. Training may proceed on AI accelerators (e.g., graphics processing units, systolic arrays, or the like) exposed by the AI platform 14, may maintain queues of previously computed vectors to enlarge the set of negatives beyond a single batch, and may periodically recalibrate scale and temperature parameters so that similarity thresholds may remain stable across corpus versions.

In some embodiments, a cluster module 26 may accept embedding vectors written by the style encoder 24 and may assign those vectors to groups that may be referenced as style clusters. The cluster module 26 may read one or more batch manifests from memory, may load vectors into working memory, and may apply preprocessing that may include re-centering, whitening, or unit-length normalization according to configuration. The cluster module 26 may write, for each processed batch, a clustering version identifier, a mapping from record identifiers to cluster identifiers, and summary statistics that may include cluster counts, dispersion measures, and representative exemplars.

In some embodiments, the cluster module 26 may construct a neighbor graph and may identify clusters by determining how connectivity (e.g., of vectors determined to be in the same cluster) may evolve as a neighborhood distance increases by modulating parameters of the clustering algorithm. The cluster module 26 may begin by computing, for each vector, a list of nearest neighbors (or neighbors within a threshold distance) according to cosine distance or another distance metric, and may add undirected edges between vectors whose mutual distance may be below a current threshold radius. The cluster module 26 may maintain a sequence of graphs formed by sweeping the radius through a range and may track the number of connected components across the sequence. The cluster module 26 may select one or more radii at which the count of connected components may remain stable over an interval and may designate the connected components at a selected radius as clusters. The cluster module 26 may compute, for each cluster, a medoid, which may be the member whose average distance to other members may be minimal, and may record that medoid as a representative for downstream labeling.

In some embodiments, the cluster module 26 may compute summaries of topological features across the sequence of neighbor graphs and may use those summaries to set parameters or to refine cluster boundaries. The cluster module 26 may record, for each connected component, a radius at which the component may first appear and a radius at which it may merge with another component, and may treat the interval between those radii as a persistence interval. The cluster module 26 may select components whose persistence intervals may exceed a configured threshold as clusters and may mark components with shorter intervals as transient groupings that may contribute members to nearby persistent clusters. The cluster module 26 may, in some embodiments, detect loop-like features by examining cycles in the neighbor graph across radii and may subdivide a component along paths that may correspond to branches or rings by splitting at articulation points.

In some embodiments, the cluster module 26 may apply a Mapper-style procedure over a scalar lens that may summarize position in the embedding space. The cluster module 26 may compute a lens value for each vector, which may be a local density estimate, a projection coordinate, or another scalar, and may cover the range of lens values with overlapping intervals. Within each interval, the cluster module 26 may group vectors that may be close in the original metric into local groups and may connect groups from adjacent intervals when the groups may share members due to interval overlap. The cluster module 26 may treat connected sets of local groups as clusters and may assign members accordingly while recording, for each cluster, which intervals contributed members so that a style labeler 30 may later inspect how a cluster may align with the lens.

In some embodiments, the cluster module 26 may identify clusters according to density connectivity without requiring a single global radius. The cluster module 26 may compute, for each vector, a core distance that may be the distance to the k-th nearest neighbor and may define a mutual-reachability distance between two vectors as the maximum of the two core distances and the direct distance. The cluster module 26 may build a minimum spanning tree over the vectors using the mutual-reachability distance and may condense the tree by removing edges above varying thresholds to form candidate groupings. The cluster module 26 may compute a stability measure for each grouping proportional to the number of members and the range of thresholds over which the grouping may persist, may retain groupings whose stability may exceed a threshold as clusters, and may mark vectors that may never join a stable grouping as outliers.

In some embodiments, the cluster module 26 may produce clusters by agglomerative procedures over pairwise distances. The cluster module 26 may begin with each vector as a singleton group and may iteratively merge the two groups with the smallest inter-group linkage distance until a stopping rule may be met. The linkage distance may be defined as the minimum, maximum, or average pairwise distance between group members, or by Ward's criterion that may consider increases in within-group variance. The cluster module 26 may construct a merge tree during this process and may cut the tree at a height selected by a stability rule that may favor plateaus in the number of groups, a distance threshold, or a constraint on within-group dispersion. The cluster module 26 may annotate each retained group with the merge heights at which it may have formed and at which it may have merged so that parameter choices may be revisited.

In some embodiments, the cluster module 26 may perform spectral grouping over a graph constructed from the vectors. The cluster module 26 may build a k-nearest-neighbor graph or an affinity graph with weights that may decrease with distance and may compute a graph Laplacian. The cluster module 26 may compute a set of leading eigenvectors of the Laplacian and may embed each vector into the coordinates given by those eigenvectors. The cluster module 26 may group the embedded points in that reduced coordinate system by applying a centroid-based grouping procedure and may select a number of groups by examining gaps between consecutive eigenvalues or by measuring stability of assignments across nearby choices of the number of groups. The cluster module 26 may record, for each group, the average of the reduced coordinates and a back-reference to members in the original space.

In some embodiments, the cluster module 26 may assign groups according to statistical mixture models. The cluster module 26 may posit that vectors may be generated by a mixture of distributions over the embedding space and may estimate mixture parameters and membership probabilities by an expectation-maximization procedure. The cluster module 26 may initialize distribution parameters and, at each iteration, may compute, for each vector, a probability of membership in each distribution and may update distribution parameters to maximize the likelihood of the observed vectors under those probabilities. The cluster module 26 may select a number of distributions according to an information criterion or may use a nonparametric prior and may update membership by sampling or variational updates until changes may fall below a threshold. The cluster module 26 may assign each vector to the group with the highest membership probability or may maintain soft assignments for downstream use.

In some embodiments, the cluster module 26 may provide centroid-based grouping when a number of groups may be given. The cluster module 26 may initialize a set of centroids, may assign each vector to the nearest centroid, may recompute each centroid as the mean or medoid of its assigned members, and may iterate assignment and recomputation until assignments may stop changing or a maximum number of iterations may be reached. The cluster module 26 may select a number of groups by running the procedure across a range of counts and may retain a count for which an internal consistency measure may fall within a configured range. The cluster module 26 may reseed centroids when a centroid may attract too few members or when a centroid may drift beyond a dispersion bound set for its members.

In some embodiments, the cluster module 26 may operate in a streaming or incremental mode. The cluster module 26 may maintain a set of current groups represented by summaries that may include centroids, counts, and dispersion statistics and may update those summaries as new vectors may arrive. The cluster module 26 may assign a new vector to a current group when the vector may be within a distance bound of that group's summary and may initialize a new group when no current group may accept the vector under the bound. The cluster module 26 may merge current groups when their summaries may approach under a merge rule and may split a current group when dispersion may exceed a threshold under a split rule. The cluster module 26 may decay counts and summaries over time so that older vectors may contribute less to assignments.

In some embodiments, the cluster module 26 may detect and record outliers and boundary members. The cluster module 26 may compute, for each vector, a local reachability density and may compute a score that may increase when the vector's neighborhood density may be much lower than that of its neighbors. The cluster module 26 may flag vectors whose scores may exceed a threshold as outliers and may record those identifiers for downstream inspection. The cluster module 26 may mark boundary members by detecting vectors whose nearest neighbors may fall across two or more groups and may record, for those vectors, secondary assignments with weights that may reflect proximity to neighboring groups.

In some embodiments, the cluster module 26 may prepare artifacts for downstream modules. The cluster module 26 may write, for each clustered group, one or more representatives that may include a medoid and high-density exemplars, may compute per-group dispersion, and may compute intra-group and inter-group distance summaries. The cluster module 26 may write a prototype vector for each group, which may be a mean or another aggregated representation, and may record associations between groups and auxiliary descriptors such as lens ranges or density ranges computed during grouping. The cluster module 26 may maintain a mapping from original record identifiers to group identifiers and may store the mapping with a clustering version that the controller 20 may reference.

In some embodiments, the cluster module 26 may support re-clustering and refinement using partial updates. The cluster module 26 may accept a set of vectors associated with one or more groups and may recompute boundaries for only those groups when an updated corpus version may be written by a training data ingest module 22. The cluster module 26 may support warm starts by seeding grouping procedures with prior summaries and may maintain lineage records that may indicate, for each group, parent groups from which the group may have been split or merged. The cluster module 26 may, in some embodiments, compute agreement measures between two grouping runs over the same records and may select, for deployment, the run whose agreement with a reference run may fall within a configured tolerance.

In some embodiments, the cluster module 26 may interoperate with the style encoder 24 during training procedures. The cluster module 26 may compute group prototypes and may provide those prototypes to the style encoder 24 as targets, and the style encoder 24 may include, in its loss, a term that may reduce the distance between member vectors and the corresponding prototype while maintaining separation from prototypes of other groups. The cluster module 26 may, in some embodiments, request updated vectors from the style encoder 24 when a re-encoding may be configured for new corpus versions and may recompute groups after re-encoding. The cluster module 26 may emit events when group summaries may change and may write those events to memory so that a controller 20 may trigger updates to a style labeler 30 or a style selector 38.

In some embodiments, the cluster module 26 may maintain parameter selection procedures. The cluster module 26 may evaluate a grid or a random sample of parameter settings, may compute internal measures that may include within-group dispersion, separation between group prototypes, and stability of assignments across resampled subsets, and may select parameter settings that may satisfy configured constraints. The cluster module 26 may, in some embodiments, select parameter settings by examining persistence of connected components or stability scores derived from density connectivity and may store selected settings with the clustering version. The cluster module 26 may record all inputs, settings, and outputs for audit and reproducibility and may make those records available to the controller 20 upon request.

In some embodiments, a cluster module 26 may define a cluster as a region of the embedding space rather than only as a set of member vectors, and may store an envelope against which a new embedding vector may be tested. The region may be specified by a convex hull computed over the member vectors and expanded by a margin that may be expressed as a fixed distance, a percentile of pairwise distances, or a per-dimension tolerance. In other embodiments, a nonconvex hull may be computed by an alpha shape that may include or exclude cavities depending on a scale parameter, or by a union of balls centered at selected members with radii that may equal local neighborhood radii. The region may also be specified by an ellipsoidal acceptance set derived from a location estimate and a covariance estimate, and a new vector may be compared by a distance that may weight directions according to the covariance. A robust covariance estimate that downweights boundary members may be used to reduce sensitivity to outliers. The cluster module 26 may further store a union of per-member Voronoi cells restricted to members assigned to the cluster, and a membership test may check whether the new vector falls inside that union by comparing distances to representatives of this and neighboring clusters.

In some embodiments, a probabilistic envelope may be constructed from a parametric or semi-parametric density over the embedding space. The cluster module 26 may fit a single distribution to the member vectors and may record a likelihood threshold that may correspond to a desired false acceptance rate, and a new vector may be accepted when its likelihood under the fitted distribution may exceed the threshold. The cluster module 26 may alternatively fit a mixture of distributions and may accept the new vector when at least one component's membership probability may exceed a threshold or when the sum of component probabilities associated with the cluster may exceed a threshold. A one-class boundary may be estimated by training a support vector data description model that may compute a minimum radius hypersphere in a transformed feature space, and a new vector may be accepted when its feature-space distance to the center may not exceed a learned bound; kernel choices and scale parameters may be recorded with the envelope. The cluster module 26 may also define a density level set by estimating a local density from k-nearest neighbors and may accept a new vector when its estimated density may exceed the minimum density observed among interior members.

In some embodiments, the region of the embedding space corresponding to a cluster (which may specify the bounds of that space corresponding to a style) may be defined from graph or prototype summaries. The cluster module 26 may retain a set of representatives such as medoids and high-density exemplars and may define the envelope as the union of balls around representatives with radii that may equal representative-specific acceptance radii computed from neighborhoods of assigned members; the radii may be increased by a margin to allow drift over time. The cluster module 26 may store a neighborhood graph of members and may accept a new vector when it may connect to the graph through edges below a threshold distance without crossing edges to other clusters below a conflicting threshold, which may be expected to preserve separation learned during training. The cluster module 26 may also record a piecewise-linear boundary by computing a triangulation of member vectors and selecting simplices that may lie on the exterior surface of the cluster, and a new vector may be tested for inclusion by barycentric coordinates with tolerance. For any of these envelopes, the cluster module 26 may maintain versioned parameters and may update margins when a style encoder 24 writes re-encoded vectors, and the controller 20 may request recomputation of envelopes when drift may be detected.

In some embodiments, a user interface (UI) module 28 may cause one or more user devices 16 to present views that allow a user to supply inputs and review outputs associated with style operations coordinated by a controller 20. The UI module 28 may obtain view models from memory and may render interactive controls that reference styles produced by a cluster module 26 and labels produced by a style labeler 30. The UI module 28 may submit user interactions as structured messages to the controller 20, and the controller 20 may route such messages to a style mixer 32, a style adapter 34, a style selector 38, or a communication generator 39. The UI module 28 may maintain client-side state that records selections and parameter values, and may reconcile that state with server-side state when responses are received over the internet 18.

In some embodiments, the UI module 28 may present a style mixing view in which a set of styles may be listed together with respective controls that accept numeric weights. The UI module 28 may implement those controls as sliders, stepper inputs, or direct numeric fields and may constrain the weights to a simplex by automatically rebalancing values when the user adjusts one weight beyond a bound. The UI module 28 may display a live mixture specification assembled by the style mixer 32, may request a preview from the communication generator 39 using the mixture and a user-supplied prompt, and may display the preview together with a measure written by a style selector 38 or a classifier that estimates similarity to selected styles. The UI module 28 may allow a user to pin a mixture preset by name and may record the preset in the model memory 36 with metadata that includes version identifiers of encoders in a style encoder 24 used to compute the underlying embedding vectors.

In some embodiments, the UI module 28 may present views for assigning priorities to styles and for requesting changes in styles using natural language text. A priority view may allow a user to order styles by dragging items or by entering priority numbers, and the UI module 28 may submit the resulting order to the style selector 38 as a constraint to be applied when multiple candidates may qualify for a context. A natural language view may accept free-form text in which a user may describe a desired shift in tone or form, and the UI module 28 may pass the text to the style labeler 30 to compute suggested adjustments to weights, additions or removals of styles, or updates to tags associated with a cluster. The UI module 28 may present a diff view in which the current mixture may be compared to a suggested mixture and may allow the user to accept, reject, or edit the suggestion before requesting generation.

In some embodiments, the UI module 28 may present views that display usage and characterizations of styles. A usage view may show counts of selections, estimated prevalence in generated communications, and recency of use per style. A characterization view may display descriptors produced by a style labeler 30 and may display representative exemplars recorded by the cluster module 26, including text snippets or thumbnails. The UI module 28 may present per-style measurements such as sentence-length distributions, lexical diversity estimates, punctuation frequency histograms, color palette summaries for image-linked styles, or prosodic summaries for audio-linked styles, and may draw such measurements from summaries computed during ingestion or labeling. A drill-down interaction may allow the user to request additional exemplars or to filter exemplars by audience descriptors that were recorded by a training data ingest module 22.

In some embodiments, the UI module 28 may present prompt-and-preview workflows. A prompt entry view may accept a prompt, a target audience, and a style mixture reference, and may submit a generation request to the communication generator 39, e.g., with a description of the message to be generated, like a draft communication in a different style from the target style. A preview panel may display one or more candidate outputs and may allow the user to request rewrites that increase or decrease formality, length, sentence complexity, or other stylistic facets; the UI module 28 may submit such requests as parameter adjustments to the style adapter 34. The UI module 28 may display per-candidate style scores and may allow the user to select a candidate for export to downstream systems through a programmatic interface or for saving to memory with annotations.

In some embodiments, the UI module 28 may provide administrative and curation views that interact with style lifecycle operations. A curator view may display cluster boundaries, representative items, and outlier lists produced by the cluster module 26 and may accept curator actions to mark members as boundary cases, to merge clusters, or to request a split. The UI module 28 may present controls to schedule re-labeling or re-encoding runs by invoking procedures through the controller 20, and may show progress and logs as the AI platform 14 executes tasks on AI models 42 under an orchestrator 40. The UI module 28 may present access controls that respect policies recorded with training corpora and may hide exemplars or summaries when access scopes from the controller 20 indicate that the current user lacks permission to view underlying records.

In some embodiments, the UI module 28 may implement latency and resilience behavior appropriate for interactive use. The UI module 28 may debounce slider movements and may submit batched updates so that downstream modules may avoid unnecessary recomputation. The UI module 28 may cancel outstanding preview requests when new inputs arrive and may display the most recent preview that matches the current parameters. The UI module 28 may cache recent style summaries and exemplars on a user device 16 to reduce repeated fetches and may validate cache entries against version tokens published by the controller 20. The UI module 28 may record interaction events such as weight changes, preview requests, and selections, and may write those events to the model memory 36 for later analysis or for reinforcement-style updates requested by the style selector 38.

In some embodiments, a style labeler 30 may assign human-readable labels to clusters produced by a cluster module 26 and may persist label artifacts and other metadata to a model memory 36 for downstream use. The style labeler 30 may receive a clustering version identifier and, for each cluster, a set of member identifiers, representative exemplars, and one or more prototype vectors. The style labeler 30 may compute descriptive statistics over the exemplars and may synthesize candidate labels that describe stylistic attributes such as formality, friendliness, or energy. The style labeler 30 may accept curator-provided label text and may map that text to a canonical label inventory, and may resolve synonyms by consulting a controlled vocabulary or a label graph maintained by the style labeler 30. The style labeler 30 may store, for each cluster, a label record that may include the chosen label, a confidence score, the method by which the label may have been assigned, and references to the exemplars that may support the assignment.

In some embodiments, the style labeler 30 may infer labels from training data without human curator input. The style labeler 30 may extract features from text exemplars that may include sentence-length distributions, token-type ratios, part-of-speech n-gram frequencies, punctuation and emoji frequencies, capitalization patterns, hedge and booster lexicon frequencies, discourse marker counts, and the like. The style labeler 30 may compute features for audio that may include estimated speaking rate, pause statistics, pitch range, energy dynamics, and spectral centroid summaries derived from short-time analysis windows. The style labeler 30 may compute features for images and video frames that may include palette histograms, saturation and luminance statistics, edge density, layout symmetry, and face or object presence counts derived from detectors. The style labeler 30 may input these features to a classifier that may output probabilities over a label inventory, and may select labels whose probabilities may exceed thresholds that may be calibrated by the style labeler 30 using held-out clusters. When multiple labels may pass, the style labeler 30 may retain a multi-label assignment and may record the probability vector for later use by a style mixer 32.

In some embodiments, the style labeler 30 may employ language-model-assisted labeling that may operate over exemplars and feature summaries. The style labeler 30 may construct a prompt that may include a small set of anonymized exemplars, per-cluster statistics, and a candidate label inventory, and may request a large language model to propose one or more labels together with justifications. The style labeler 30 may parse the response, may normalize tokens to the canonical label inventory, and may compute agreement between the model-proposed labels and the classifier outputs. The style labeler 30 may apply a decision policy that may accept labels when agreement may exceed a threshold, may request additional exemplars when agreement may be low, or may leave a cluster unlabeled and flag it for curator review through a user interface (UI) module 28. The style labeler 30 may, in some embodiments, construct pairwise preference prompts between competing labels and may aggregate preferences by a voting rule to break ties.

In some embodiments, the style labeler 30 may associate metadata with each labeled cluster that may be used when mixing, selecting, or applying styles. The style labeler 30 may compute mixture constraints that may include compatibility scores between pairs of labels, where the scores may be estimated from co-occurrence of features across clusters or from curator-provided matrices. The style labeler 30 may compute decoder parameter priors that may include suggested temperature ranges, length ranges, and repetition penalty ranges for a communication generator 39, and may store such priors with tolerances so that a style adapter 34 may translate them to model-specific parameters. The style labeler 30 may compute do and do-not lists that may comprise token-level or phrase-level preferences derived from exemplar n-grams, and may include per-list weights that a style adapter 34 may apply as soft constraints during generation. The style labeler 30 may record audience suitability tags inferred from metadata ingested by a training data ingest module 22 and may include per-audience weights that a style selector 38 may apply when a prompt may include an audience descriptor.

In some embodiments, the style labeler 30 may derive temporal and usage metadata for each labeled cluster. The style labeler 30 may read selection and application events written by the controller 20 and may compute recency, frequency, and time-of-day usage profiles. The style labeler 30 may compute stability measures that may quantify how cluster membership and label probabilities may change across corpus or encoder versions and may record a stability score together with drift indicators. The style labeler 30 may record provenance fields that may include the clustering version, the encoder version of a style encoder 24, the feature extractors and their parameter versions, and the language model prompt templates and model versions used during assisted labeling. The style labeler 30 may attach compliance flags that may indicate whether exemplars associated with a label may have elevated risks such as presence of personally identifiable information or sensitive topics, where the flags may be set by heuristic scanners or classifiers and may be used by a style selector 38 to filter candidate styles. Other metadata may include success rates for desired outcomes when using the corresponding style, like sales, resolved disputes, closed issues, learned material, and the like.

In some embodiments, the style labeler 30 may compute per-label exemplar sets and representative summaries. The style labeler 30 may select medoids and high-density exemplars from the cluster module 26 and may extract short, content-neutral snippets that may preserve stylistic surface features; the style labeler 30 may store these snippets for display and for few-shot conditioning when requested by the style adapter 34. The style labeler 30 may compute saliency maps that may identify tokens, audio frames, or image regions that may contribute most to the label classifier's output for the cluster and may store those maps so that future labeling passes may verify consistency. The style labeler 30 may compute a per-label embedding prototype that may be a normalized average of member vectors or a learned prototype vector, and may expose that prototype to a style mixer 32 for mixture computation and to a style selector 38 for nearest-prototype selection during inference.

In some embodiments, the style labeler 30 may maintain a label inventory schema and may perform lifecycle operations. The style labeler 30 may maintain hierarchical relationships between labels, may support aliasing and deprecation of labels, and may remap clusters to updated labels by a migration procedure that may record lineage. The style labeler 30 may retrain label classifiers when sufficient curator feedback may be recorded, and may recalibrate probability thresholds to maintain target precision and recall; expected benefits may include more stable selection and mixing behavior across corpus versions. The style labeler 30 may expose programmatic interfaces through which the controller 20 may request batch relabeling, single-cluster relabeling, or label export for audit, and may write all label records, metadata, and confidence estimates to memory with version tags so that other components may reference a consistent view during operation.

In some embodiments, a style mixer 32 may accept a selection of multiple styles corresponding to multiple clusters produced by a cluster module 26 and may compute a mixed style specification that other components may apply. The style mixer 32 may receive, for each selected style, a weight that may be supplied by a user through a user interface (UI) module 28 or may be inferred automatically by a style selector 38 from prompt context, audience descriptors, or prior interaction signals written by a controller 20. The style mixer 32 may normalize weights so that they sum to one, may apply sparsity or minimum-weight constraints to avoid degenerate mixtures, and may record the resulting mixture vector and parameters in memory under an identifier that a communication generator 39 may later reference. When the selected styles may have been defined across different modalities, the style mixer 32 may read the corresponding prototype vectors from a shared embedding space computed by a style encoder 24 so that mixing may proceed consistently across text, image, audio, or video sources.

In some embodiments, the style mixer 32 may compute an interpolated representation of clustered groups in the embedding space by forming a convex combination of per-style prototype vectors or medoids, and may project the result back onto a manifold learned by the style encoder 24 by a short gradient step or a normalization calibrated during training. The style mixer 32 may additionally compute an envelope for the mixed style as a region around the convex combination, such as an ellipsoid whose axes may be derived from a weighted covariance of member vectors from the contributing clusters, or as a union of balls centered along the line segment or polyline connecting the contributing prototypes with radii proportional to local cluster densities. The style mixer 32 may sample one or more conditioning vectors from this envelope and may provide those vectors to a style adapter 34, which may translate the vectors into model-specific parameters or tokens for the communication generator 39. For a mixture of a friendly style and a formal style, the style mixer 32 may compute a point on the line segment between the friendly and formal prototypes according to the supplied weights, may expand a small acceptance region around that point, and may pass the point and region to downstream components for decoding-time steering.

In some embodiments, the style mixer 32 may produce a mixed specification that includes both an embedding-space component and decoding priors derived from metadata attached by a style labeler 30. The style mixer 32 may read per-style priors such as temperature ranges, target length ranges, repetition penalties, sentence-length histograms, phrase preference lists, and disallowed-token lists, and may blend those priors by weighted averaging, by max or min composition for safety lists, or by rule-based composition when a compatibility matrix indicates that a pair of styles may require specific handling. The style mixer 32 may output a specification that includes the mixed embedding vector, blended decoding priors, and per-style soft constraints that a style adapter 34 may map to the parameter space of the target language model, including style tokens that may be derived from cluster centroids, per-style adapter coefficients when parameter-efficient adapters may be available, or per-token bias maps that may be applied during beam or nucleus sampling. The style mixer 32 may attach thresholds for a downstream style classifier so that a generation pass may be scored against the intended mixture and, when the score may fall below a bound, a regeneration pass with adjusted weights may be requested.

In some embodiments, the style mixer 32 may compute mixtures by procedures other than linear interpolation. The style mixer 32 may perform geodesic interpolation in a reduced coordinate system learned from the embedding space and may map the result back to the original space by a decoder trained for that purpose, which may be expected to keep the mixture near regions populated by training examples. The style mixer 32 may select a small set of exemplars from each contributing cluster and may compute a barycentric combination of their hidden states according to attention weights derived from the supplied mixture weights, after which a projection head may produce a mixed vector. The style mixer 32 may, when parameter-efficient adapters such as low-rank adapters may be associated with styles, compute a mixture of adapters by a weighted sum of adapter parameters and may emit adapter weights for activation in the communication generator 39. The style mixer 32 may, in some embodiments, maintain mixture-specific do and do-not lists by taking the union of the constituent lists and downweighting conflicting items according to learned or curator-provided compatibility scores.

In some embodiments, the style mixer 32 may incorporate feedback and guardrails during mixture computation. The style mixer 32 may consult audience suitability tags supplied by a style labeler 30 and may adjust or cap weights when a requested mixture may violate a policy recorded with a training corpus by a training data ingest module 22. The style mixer 32 may request a fast forward pass through a style classifier over short probe generations from the communication generator 39 using a candidate mixture and may nudge the weights by a small step toward a direction that may increase the classifier's agreement with the requested mixture, and may repeat this step a limited number of times before returning the final specification. The style mixer 32 may record mixture presets in memory with the encoder version of the style encoder 24 and the clustering version of the cluster module 26 so that downstream generations may be reproduced. The style mixer 32 may expose an interface by which the controller 20 may request mixtures seeded by natural language descriptions supplied by a user or obtained from prompt context, in which case the style mixer 32 may map the description to style weights by matching the description against cluster labels and descriptors stored by the style labeler 30 and by solving for weights that may minimize the distance between the mixed vector and a target computed from the description.

In some embodiments, a style adapter 34 may transform un-mixed or mixed style specifications into model-facing parameters that a communication generator 39 may apply, and may update those parameters over time according to feedback, usage statistics, and user requests recorded by a controller 20. The style adapter 34 may ingest a mixed (or unmixed) style specification from a style mixer 32 or labeler 30 that may include an embedding-space vector, per-style weights, and decoding priors, and may map that specification to one or more controllable artifacts such as style tokens, per-layer prefix vectors, parameter-efficient adapters inserted into transformer layers, decoding-time bias maps over tokens, and constraint lists. The style adapter 34 may maintain versioned parameter sets keyed by a style identifier and may write updated sets to memory together with provenance that may include the contributing clusters from a cluster module 26, label metadata from a style labeler 30, and time ranges and audiences drawn from a training data ingest module 22.

In some embodiments, the style adapter 34 may adapt parameters through a reinforcement learning loop that may include a state, an action, and a reward definition derived from observable outcomes of generated communications. The state may include the requested mixture weights, the target audience, recent usage statistics for the styles, and the last applied decoding priors. The action may include adjustments to boundaries of the style in the embedding space, adjustments to metadata for the style (like priority), mixture weights within configured bounds, adjustments to decoding priors such as temperature and target length, and selection or reweighting of style tokens or adapter coefficients. The reward may be computed from one or more signals including explicit user ratings, success rates in desired outcomes from communications, selection rates in A/B tests, dwell time, downstream task completion markers, and classifier scores that estimate agreement with intended style. The style adapter 34 may implement a Q-learning procedure by maintaining a function approximator for an action-value function that may accept a state and action vector and may output an expected cumulative reward. After a generation is scored, the style adapter 34 may compute a temporal-difference target using the observed reward and the maximum predicted value of successor actions for the next state, may compute a squared error between the target and the current prediction, and may update the approximator by stochastic gradient descent. An exploration policy such as epsilon-greedy may select exploratory actions at a configured rate. A replay buffer may store recent transitions so that the function approximator may be trained on decorrelated batches; target network parameters may be updated on a slower cadence to improve stability.

In some embodiments, the style adapter 34 may apply policy-gradient updates for continuous action spaces in which small shifts to mixture weights and decoding priors may be desirable. The style adapter 34 may represent a policy that, given a state, may output a distribution over bounded action vectors, and may perform an update by sampling actions, observing rewards, computing a baseline such as a moving average of rewards, and ascending the gradient of the expected reward with respect to policy parameters. A clipped importance weight may be applied when using off-policy data from a replay buffer. The style adapter 34 may constrain actions by projecting updates into a feasible set that may satisfy mixture-weight simplex constraints and per-parameter bounds recorded with label metadata, and may record the projected actions as the applied adjustments. In other embodiments, a contextual bandit may be used when there may be no delayed effects across steps. The style adapter 34 may estimate reward models per action family and may select actions by Thompson sampling from posterior distributions that may be updated with conjugate or approximate Bayesian updates based on observed rewards.

In some embodiments, the style adapter 34 may adapt model-facing parameters without changing base model weights by updating small parameter-efficient modules and embeddings that may condition generation. The style adapter 34 may maintain low-rank adapters within selected transformer layers and may update those adapters by computing gradients of a style-agreement objective evaluated on short probe generations and curator-approved exemplars, and may restrict updates to the adapter matrices and style token embeddings while freezing base weights. A style-agreement objective may include a classifier score that increases when generated text may match the intended mixture, penalties for violations of do and do-not lists supplied by the style labeler 30, and a length and sentence-complexity penalty that may steer toward per-style priors. The style adapter 34 may schedule short fine-tuning steps on mini-batches of recent prompts paired with observed rewards and may roll back an update when offline evaluation on a held-out probe suite may show a regression outside configured tolerances; expected benefits may include faster convergence under drift.

In some embodiments, the style adapter 34 may adapt decoding-time controls by learning token-level or phrase-level bias maps that may be applied to vocabulary logits during sampling. The style adapter 34 may compute n-gram statistics for exemplars associated with each contributing cluster and may maintain a weighted combination of these statistics for a requested mixture; during generation, the style adapter 34 may add a small positive bias to tokens that raise the mixture's classifier score and may subtract a bias from tokens that correlate with an off-style classification. The bias magnitudes may be learned by a procedure that, for each step in decoding, compares the classifier's confidence for the partial hypothesis under the current biases to the confidence under a perturbed bias vector and may nudge the biases along the gradient that may increase expected agreement. The style adapter 34 may bound per-token biases and may decay learned biases over time so that usage statistics and fresh feedback may drive adjustments.

In some embodiments, the style adapter 34 may process explicit user requests to adjust style and may map natural language text into concrete parameter updates. The style adapter 34 may receive a request such as a directive to increase friendliness and reduce formality, may match request terms against the label inventory maintained by the style labeler 30, and may compute a weight delta vector that may increase weights on friendly-linked clusters and may decrease weights on formal-linked clusters within bounds. The style adapter 34 may also translate requests into decoding-prior changes by raising temperature within a per-style range, adjusting target sentence length, or toggling contraction usage when permitted by do and do-not lists. The style adapter 34 may record the request, the computed deltas, and pre- and post-generation classifier scores and may feed these records back into the reinforcement or bandit learners so that future automatic adjustments may account for user intent.

In some embodiments, the style adapter 34 may adapt parameters according to usage statistics that the controller 20 may aggregate. The style adapter 34 may maintain per-style and per-audience counters for selection frequency, acceptance rate, and recency, and may compute priors that may tilt mixture initialization toward recently successful styles for similar audiences. A Bayesian update may maintain posterior distributions over mixture weights conditioned on audience and prompt descriptors, and the style adapter 34 may sample initial weights from these posteriors before a generation pass. The posteriors may be updated after each accepted communication by adjusting sufficient statistics and may be decayed over time so that older evidence may contribute less strongly. The style adapter 34 may detect drift when acceptance rates for a style may fall below a threshold for a sustained period and may reduce default weight ranges or request curator review through a user interface (UI) module 28.

In some embodiments, the style adapter 34 may apply state-space estimation procedures to track slowly changing style parameters. The style adapter 34 may maintain a latent vector representing mixture defaults for a segment such as a team or audience and may apply a Kalman filter that may predict the latent vector forward in time and may update it with noisy observations derived from accepted mixtures and rewards. The process noise may be configured to allow gradual shifts while avoiding abrupt changes unless repeated evidence may support the change. The updated latent state may be translated into default mixture weights and decoding priors for new requests matching the segment descriptors. The style adapter 34 may also fit simple generalized linear models that may predict adjustments from contextual features such as audience, channel, and prompt length, and may combine these predictions with the latent-state estimate by learned weights.

In some embodiments, the style adapter 34 may adapt envelopes that define acceptance regions around mixed embedding vectors so that conditioning vectors may remain within regions that may be expected to express the intended style. The style adapter 34 may expand or shrink ellipsoidal envelopes based on classifier agreement on recent generations by increasing radii along directions that may show under-coverage and by decreasing radii along directions that may admit off-style generations. The style adapter 34 may sample candidate conditioning vectors within the envelope and may evaluate a fast surrogate classifier; when the classifier may predict low agreement, the style adapter 34 may adjust the envelope parameters and may resample until predicted agreement may exceed a threshold or a sampling budget may be reached. Envelope versions and adjustments may be recorded with mixture identifiers and encoder versions so that subsequent generations may remain reproducible.

In some embodiments, the style adapter 34 may coordinate safety and compliance constraints when updating parameters. The style adapter 34 may intersect do-not lists from the contributing styles, may apply the maximum penalty across lists for tokens that appear on any list, and may cap increases to temperature and length when compliance flags recorded by the style labeler 30 may be set for a style. The style adapter 34 may maintain a rule set that may map organizational policies to parameter bounds and mixture limits and may enforce these rules. The style adapter 34 may log all applied updates with justifications that may include the source of the feedback signal, the algorithm that computed the adjustment, and the before-and-after parameter values so that a curator may audit changes and request reversion when required.

In some embodiments, the model memory 36 may provide memory-augmented neural network facilities that components may call during selection, adaptation, and generation. The model memory 36 may expose an external differentiable memory that may present key and value matrices together with content-based and location-based addressing primitives. A style selector 38 may request read keys derived from a prompt and audience descriptor and may obtain a weighted mixture of values that may include recent successful mixtures, decoder parameter adjustments, and short exemplars; the style selector 38 may write back a new key-value pair after a generation so that future requests with similar descriptors may retrieve the update. The model memory 36 may maintain temporal links among written addresses so that a read head may traverse recent sequences of related interactions, and may maintain usage weights that may decay over time so that older entries may be selected less frequently. The controller 20 may configure read gates and write gates by passing scalars that may bound update magnitudes and may record the gate settings with each write so that experiments may be reproduced. When differentiable access may not be required, a non-differentiable key-value store may be offered with approximate matching over keys by hashing or by vector similarity, and the returned values may be fed into a style adapter 34 as initialization parameters for decoding-time control.

In some embodiments, a style selector 38 may determine, for a given request, a set of styles and corresponding weights that a style mixer 32 may use to form a mixture specification. The style selector 38 may accept explicit selections supplied by a user through a user interface (UI) module 28, including per-style weights and presets, and may record such selections and presets in a model memory 36 with identifiers that a controller 20 may reference when routing a generation to a communication generator 39. When a user supplies a natural language request that describes a desired tone, the style selector 38 may parse the request, may map request terms to labels and descriptors recorded by a style labeler 30, and may compute an initial weight vector over clusters produced by a cluster module 26. The style selector 38 may normalize the weights to a simplex, may apply compatibility constraints attached to the labels, and may yield the resulting weights to the style mixer 32 along with a pointer to any presets referenced by the user. In some cases, styles may be chosen based upon responses of an audience to earlier communications. For instance, a response to an earlier communication may indicate that the user is getting upset, and a different style, like a more conciliatory calm, conscientious, or friendly style may be adopted in response.

In some embodiments, the style selector 38 may infer styles without explicit user weights by analyzing prompt content, audience descriptors, and recent outcomes associated with similar contexts stored in the model memory 36. The style selector 38 may compute features from the prompt, including length, detected entities, and formality cues, and may combine those features with audience tags written by a training data ingest module 22 or supplied by the caller. A classifier may accept these features and may output probabilities over labels recorded by the style labeler 30; the style selector 38 may convert the probabilities into a weight vector and may bound individual weights according to per-style limits. A nearest-prototype procedure may retrieve the closest style prototypes in the embedding space produced by a style encoder 24 by submitting a query vector derived from the prompt and audience features to a vector index in the model memory 36; the style selector 38 may compute weights proportional to similarity scores and may pass those weights to the style mixer 32. A retrieval-augmented variant may read, from a memory-augmented namespace of the model memory 36, value records associated with keys derived from similar prompts and audiences, and may combine retrieved mixture weights with the classifier output by a learned or rule-based interpolation.

In some embodiments, the style selector 38 may formulate mixture selection as an optimization. The style selector 38 may define variables representing weights for a subset of candidate styles and may impose constraints that include non-negativity, unit-sum, and per-style caps; additional constraints may reflect compatibility scores and audience suitability flags recorded by the style labeler 30. The style selector 38 may define an objective that may include agreement with the classifier distribution, proximity to retrieved successful mixtures, and soft penalties for violating do and do-not lists when combined priors would conflict. The style selector 38 may solve the objective by projected gradient steps or by coordinate descent with early stopping when changes fall below a threshold. The style selector 38 may, in other embodiments, select a small candidate set by beam search over labels with the highest classifier scores and may perform a localized optimization only on that set to reduce computation.

In some embodiments, the style selector 38 may adjust selections online according to reinforcement or bandit feedback. The style selector 38 may maintain, for each audience segment, a posterior distribution over mixture weights that may be updated after each accepted output. A Bayesian update may record sufficient statistics per style and may draw initial weights for new requests by Thompson sampling; after a generation is scored, the statistics may be updated and decayed over time so that older evidence may have reduced impact. A Q-learning loop may treat the current mixture and context as a state and small changes to weights as actions; after feedback is written by the controller 20, the style selector 38 may compute temporal-difference targets and may update an action-value function approximator. The selector may alternate exploitation and exploration by an epsilon-greedy policy and may write the chosen weights and observed rewards to a replay buffer in the model memory 36. A contextual bandit alternative may estimate reward models conditioned on prompt and audience features and may choose among a discrete set of candidate mixtures generated from the top labels, with parameters updated after each outcome.

In some embodiments, the style selector 38 may incorporate sequence-aware memory so that recent user choices and outcomes may influence near-term decisions. A memory-augmented read may compute keys from the current prompt and audience and may retrieve values that include prior mixture weights and decoder adjustments associated with similar requests; read gates and interpolation coefficients may be set according to similarity scores and recency fields. The style selector 38 may write back the final mixture and outcome so that future reads may access the new experience, and may maintain usage weights over addresses that may decay with time or with access count. When repeated requests arrive during an active session, the style selector 38 may bias toward consistency by penalizing abrupt changes in weights, with penalty magnitudes stored per session. The selector may, in some embodiments, request short probe generations from the communication generator 39 using a candidate mixture and may adjust the weights by a small step in a direction that increases a style classifier score before returning the final mixture.

In some embodiments, the style selector 38 may support curator and policy inputs during selection. The selector may accept a matrix of per-pair compatibility scores and mixture exclusions maintained by the style labeler 30 and may zero or cap weights for disallowed combinations before normalization. The selector may receive organizational policies recorded by the controller 20 that specify audience-specific caps or required components and may project a computed weight vector into the feasible set defined by such constraints. The selector may apply recency and frequency priors determined from aggregates so that default weights for a segment may reflect recent acceptance patterns, and may annotate the returned mixture with provenance that includes the classifier version, retrieval snapshot, and optimization settings. The selector may record disagreements between the classifier-based selection and the memory-based or policy-based adjustments and may write such events so that a style adapter 34 may take them into account during future adaptation steps.

In some embodiments, the techniques by which the style selector 38 chooses and mixes styles may evolve over time. The selector may monitor calibration metrics for classifier confidence, retrieval accuracy, and downstream acceptance, and may request recalibration of similarity temperatures and thresholds when distributions drift after updates to a style encoder 24 or a cluster module 26. The selector may replace or augment feature extractors for prompts and audiences, may widen or narrow candidate label sets based on observed confusion, and may update optimization bounds and penalty coefficients according to curator guidance. The selector may maintain versioned selection policies and may support A/B deployment managed by the controller 20 so that newer policies may write to separate namespaces while prior policies remain available. The selector may, in some embodiments, promote learned presets for recurring workflows by clustering chosen mixtures across sessions and may surface those presets through the UI module 28 as starting points that users may adjust before requesting generation.

In some embodiments, a communication generator 39 may receive from a controller 20 a prompt or structured request together with a reference to a selected style or a mixed style produced by a style mixer 32 and may retrieve from a model memory 36 a mixture specification that may include an embedding-space conditioning vector, per-style weights, decoder priors, constraint lists, and provenance identifiers. In some embodiments, the communication generator 39 may request from a style adapter 34 a model-facing parameter pack that may include one or more of style tokens derived from cluster centroids maintained by a cluster module 26, prefix vectors for transformer layers, parameter-efficient adapter weights, per-token bias maps, decoding parameter bounds, and grammar or template constraints, and may stage these artifacts for use by inference services exposed by an AI platform 14 through an orchestrator 40 addressing selected AI models 42. Outputs may be in any of the forms supported by the described AI models 42 and may include natural language text, spoken audio created with text-to-speech models, images created with diffusion models, video created with diffusion models, and the like.

In some embodiments, the communication generator 39 may implement a prompt-conditioning path in which a prompt template may be constructed from a system preamble, a short instruction derived from labels and metadata stored by a style labeler 30, and a small set of anonymized exemplars using the selected style identifiers, and may insert style tokens supplied by the style adapter 34 at designated positions in the template. In some embodiments, the communication generator 39 may submit the templated prompt to a target language model and may perform decoding using nucleus or top-k sampling with temperature and repetition penalties bounded by per-style priors, and may apply per-token logit biases supplied by the style adapter 34 so that tokens associated with requested stylistic surface features may receive small positive adjustments while tokens listed on do-not lists may receive negative adjustments.

In some embodiments, the communication generator 39 may implement a prefix-tuning path in which layer-specific key and value vectors may be injected prior to attention computation and may be produced from the mixed embedding vector by a small projection network, and may decode outputs while a classifier head running in parallel may score partial hypotheses for agreement with the requested mixture and may feed back a scalar that may adjust sampling temperature within configured bounds at each step. In some embodiments, the communication generator 39 may implement classifier-free guidance in which a neutral path and a style-conditioned path may be executed in tandem and token logits may be combined by adding a scaled difference between conditioned and neutral logits, and may schedule the guidance scale across decoding steps according to a schedule stored with the mixture specification.

In some embodiments, the communication generator 39 may implement an adapter-activation path in which parameter-efficient adapters associated with constituent styles may be loaded into designated transformer layers and may be combined by a convex weighting equal to the requested mixture weights, and may freeze base model weights while executing inference with the mixed adapters active. In some embodiments, the communication generator 39 may implement a gated-residual path in which the mixed embedding vector may be projected to per-layer gates that may scale residual streams before attention and feed-forward blocks, and may compute the gates once per generation or per decoding step subject to a budget recorded in the mixture specification.

In some embodiments, the communication generator 39 may implement a constrained decoding path in which a finite-state or context-free grammar may be constructed from structure metadata attached to the selected style or audience, and may apply a constraint solver that may prune tokens not admitted by the next valid states of the grammar at each decoding step, and may combine this pruning with logit biases and guidance described above. In some embodiments, the communication generator 39 may implement template-aware decoding in which a layout containing placeholders such as greeting, body paragraphs, and sign-off may be populated sequentially, and may reinitialize local decoding parameters per segment using per-segment priors stored with the style's metadata so that sentence length distribution and punctuation frequency per segment may align with segment-specific targets.

In some embodiments, the communication generator 39 may implement a candidate-pool path in which multiple candidates may be generated under different seeds, beam widths, or guidance scales drawn from ranges in the mixture specification, and may rank candidates by a scoring function that may include a style-agreement classifier score, penalties for violating do and do-not lists, and distances in the embedding space to the mixed conditioning vector, and may select a candidate that may satisfy a threshold or may request a small rewrite pass if no candidate may meet the threshold. In some embodiments, the communication generator 39 may implement a two-pass rewrite in which a first pass may focus on content completeness using a neutral configuration and a second pass may apply the style mixture to rewrite sentences while preserving content tokens identified by span masks computed in the first pass.

In some embodiments, the communication generator 39 may perform few-shot retrieval and grounding prior to decoding by querying memory for recent accepted communications with similar prompts and audiences and may extract short style-indicative snippets as additional exemplars, and may insert these exemplars in the prompt or may compute a small bias vector by averaging token embeddings of the snippets and adding the bias to hidden states prior to the language model's output layer. In some embodiments, the communication generator 39 may apply per-style structural operators derived from metadata produced by the style labeler 30, such as sentence-splitting probabilities, contraction preferences, or salutation forms, and may realize these operators by post-step edits applied to the partially decoded text when specific patterns may occur.

In some embodiments, the communication generator 39 may support multimodal style transfer by accepting a conditioning vector derived from an image or audio exemplar produced by a style encoder 24 and may project that vector to the language model's hidden size to form a per-step additive control signal, and may maintain a small gate that may reduce the control magnitude when a running classifier applied to partial hypotheses may exceed a style-agreement threshold to avoid over-steering. In some embodiments, the communication generator 39 may emit prosody directives for downstream text-to-speech when an audio style may be requested, and may compute rate, pause, and pitch parameters from per-style priors blended by the requested weights and may interleave these directives with text tokens for consumption by a speech synthesizer.

In some embodiments, the communication generator 39 may support interactive refinement by accepting delta requests from a user or a calling service that may direct increases or decreases along labeled style axes stored by the style labeler 30, and may adjust either mixture weights or decoding priors within bounds and may perform a light edit pass that may rephrase sentences with minimal span edits guided by a masked-language infill model, and may recompute style-agreement scores and distances in the embedding space after each edit. In some embodiments, the communication generator 39 may maintain reproducibility by writing the prompt, mixture identifier, parameter pack version, random seeds, and decoding traces and may return identifiers that may allow later regeneration of the same output or targeted variations obtained by changing a designated subset of parameters.

In some embodiments, the communication generator 39 may coordinate with a style adapter 34 to perform probe-and-adjust cycles when initial outputs may not satisfy style thresholds, and may compute short probe generations under multiple micro-variations of guidance scale, prefix strength, or adapter blend coefficients drawn from a lattice recorded in the mixture specification, and may select the micro-variation that may maximize expected style-agreement on the probes before performing a full decode for the final output. In some embodiments, the communication generator 39 may apply safety and policy rules supplied by the controller 20 and the style adapter 34 by intersecting disallowed token sets, capping temperature and length by audience segment, and invoking a content filter on candidates prior to selection, and may log applied rules with the output record.

In some embodiments, the communication generator 39 may expose batching and streaming behaviors appropriate for interactive traffic by grouping requests that may share the same target model and compatible parameter packs, by reusing cached key/value states for static prefixes supplied by the style adapter 34, and by streaming partial tokens to a user interface (UI) module 28 while continuing to score partial hypotheses for style compliance so that the stream may be paused and resumed with adjusted parameters when classifier scores may drift outside configured bounds. In some embodiments, the communication generator 39 may publish per-request metrics, including time to first token, decode duration, classifier scores, rule hits, and distances in the embedding space to the requested mixture, and may record these metrics for later analysis by the controller 20 and adaptation by the style adapter 34.

In some embodiments, a communication generator 39 may compose a request to an AI platform 14 that includes fields that steer decoding toward a selected style or mixture of styles. The request may include a system message that states style constraints in natural language, a user message that carries the prompt, and a style pack identifier that references artifacts stored in memory. The style pack identifier may resolve to one or more of a mixed embedding identifier derived from a style mixer 32, a list of style token identifiers derived from cluster centroids produced by a cluster module 26, and per-layer prefix vector identifiers to be injected as soft prompts. The request may further specify decoding controls such as temperature, nucleus probability, top-k limit, maximum tokens, presence and frequency penalties, stop sequences, random seed, number of candidates to generate, and a guidance scale for classifier-free guidance when both conditioned and neutral passes may be executed. The request may also reference bias maps by identifier, where a bias map may contain per-token adjustments for phrases favored or disfavored by labels produced by a style labeler 30, and may reference a grammar or template identifier when constrained decoding may be requested so that greetings, sign-offs, or other structures may be realized consistently.

In some embodiments, the request may include parameters to activate model-facing adapters that express the selected mixture. The request may specify an adapter blend vector whose entries may be weights for parameter-efficient adapters associated with constituent styles, a prefix strength schedule that may scale soft-prompt keys and values across decoding steps, and per-segment priors for length and sentence complexity that a target model may apply when filling structured templates. The request may carry small exemplar snippets as additional context, a reranking directive asking the AI models 42 to return token log-probabilities for candidate responses so that a downstream style classifier may score agreement, and a rewrite directive that supplies an initial draft together with instructions to revise toward specified labels and do and do-not lists. In other embodiments, the request may provide a conditioning vector identifier computed from non-text style exemplars by a style encoder 24, along with a projection policy that indicates whether the vector may be used as an additive control on hidden states, as a learned style token, or as a lookup for per-layer gates. The request may include policy and audience tags so that platform-side safety filters and parameter caps recorded by a style adapter 34 may be applied before decoding, and may ask the AI platform 14 to return provenance fields and usage metrics that the controller 20 may record for later adaptation.

In some embodiments, when an operator controls AI models 42 on an AI platform 14, a fine-tuning pipeline may adjust model parameters so that generated or rewritten text may accord with a selected style or a mixture of styles. A controller 20 may assemble training examples from memory that include prompts, target texts annotated with one or more style labels produced by a style labeler 30, and mixture weights produced by a style mixer 32. A supervised phase may perform gradient updates on the model to increase the likelihood of target tokens while conditioning on style tokens, prefix vectors, or mixed embedding vectors derived from cluster centroids produced by a cluster module 26. A reinforcement phase may follow in which a reward function may score candidates according to style-agreement classifiers, adherence to do and do-not lists, audience policy tags, and curator ratings; a policy update may then adjust model parameters by computing per-token advantages from these rewards and performing clipped gradient steps that may keep the new policy within bounded divergence from the pre-update policy. The pipeline may record versioned checkpoints, tokenizer revisions, and style-conditioning artifacts for reproducible deployment.

In some embodiments, parameter-efficient adapters may be inserted into attention or feed-forward layers so that style behavior may be adjusted without updating base weights. A style adapter 34 may prepare low-rank matrices for each selected style or for mixture components and may place these matrices in residual paths of designated transformer layers. During training, only the adapter parameters and any style token embeddings may be updated while base model parameters remain fixed. For a requested mixture, the communication generator 39 may activate a convex combination of per-style adapter parameters according to the supplied weights, and a short tuning pass may refine the combination by backpropagating a style-agreement objective on probe generations. Variations may include prefix-tuning in which key and value vectors may be learned per layer and concatenated to attention caches; prompt-tuning in which a learned sequence of virtual tokens may be prepended to the input; and per-layer gates that may scale residual streams using a vector derived from a mixed style embedding. Adapter placements, layer indices, and mixture coefficients may be stored as a parameter pack.

In some embodiments, reinforcement learning policies may be applied directly to steer style at decode time when the operator controls the serving stack. A policy network may predict adjustments to decoding controls such as temperature, repetition penalty, and per-token bias magnitudes conditioned on the prompt, the target audience, and intermediate hidden states; an environment step may run a partial decode for a fixed number of tokens, compute a reward from streaming style-agreement scores and constraint violations, and return an updated state to the policy network. A value function may estimate expected future reward, and temporal-difference targets may be computed to update both policy and value parameters. An alternative Q-learning formulation may discretize small changes to mixture weights and decode knobs as actions, maintain an action-value function approximator, and train it on tuples recorded by the controller 20 in a replay buffer. An epsilon-greedy exploration schedule may be applied and gradually reduced as confidence increases. Learned policies and value functions may be versioned so that the controller 20 may roll forward or back per audience segment.

In some embodiments, a mixture-of-experts architecture may assign different experts to different styles or style families and may route tokens or spans among experts according to a gating function that may consume the mixed style embedding and the current hidden state. During training, expert-specific adapters or full expert blocks may be updated on batches biased toward the expert's associated labels, while a gate may learn routing weights constrained to a simplex. In operation, the communication generator 39 may provide mixture weights to the gate, and the gate may compute per-token expert weights. Expert outputs may be combined by a weighted sum, and sparsity constraints may select only a limited number of experts per step. A curator may approve expert-label associations, and the style labeler 30 may update associations when clusters drift; the controller 20 may record routing statistics so that routing thresholds may be adjusted over time.

In some embodiments, a smaller rewriting model may be fine-tuned to post-edit text produced by a larger foundation model toward a target style or mixture. A training set may be built by pairing neutral outputs with curator-edited or classifier-selected rewrites that better match style labels, and the rewriter may be trained to transform the neutral text into the styled text while preserving named entities and content spans indicated by masks. The rewriter may accept as inputs the neutral text, a compact style brief synthesized from labels and do and do-not lists, and a mixed style embedding, and may output a revised text that the communication generator 39 may score and, if needed, pass through another light rewrite step to adjust sentence length distribution or punctuation frequency toward per-style priors. The smaller model may also be trained as a constrained infill model that edits only spans marked by a detector that flags off-style sentences according to a classifier; inference may iterate detection and infill until classifier scores meet thresholds or a step budget may be reached.

In some embodiments, operator-controlled decoders may expose hooks for logit shaping and structure enforcement aligned with stored style metadata. A per-step callback may add bias vectors to vocabulary logits based on n-gram preferences derived from representative exemplars, subtract penalties for phrases listed in do-not lists, and clamp adjustments within configured bounds. A constraint engine may track a template of required sections and punctuation targets and may prune token sets that would violate remaining structure; when pruning would empty the set, the engine may backtrack to the previous token and relax the least-impact constraint. The serving stack may cache attention states for static style prefixes, may batch compatible requests sharing parameter packs, and may stream tokens while a parallel scorer evaluates style agreement so that decoding controls or adapter coefficients may be nudged mid-stream according to a schedule recorded with the mixture. All updates to adapters, gates, policies, and rewriter checkpoints may be written with lineage to memory so that subsequent selections by a style selector 38 and mixtures by a style mixer 32 may reference a coherent set of deployed style behaviors.

In some embodiments, the AI platform 14 may include an orchestrator 40 and multiple artificial intelligence models 42 exposed through service interfaces. The orchestrator 40 may accept incoming requests that may include a system prompt, a content prompt, and decoding settings, may parse routing metadata such as model identifiers and stage assignments, and may dispatch the request to one or more artificial intelligence models 42 according to configured policies. The orchestrator 40 may maintain per-request context such as correlation identifiers, may apply rate limits and batching rules, and may sequence multi-stage flows by issuing a series of sub-requests in which outputs from earlier stages may be transformed and forwarded to later stages. The orchestrator 40 may record request and response metadata, may handle retries on transient failures, and may expose streaming or non-streaming response modes to downstream consumers.

In some embodiments, each artificial intelligence model 42 may provide an inference endpoint that may accept prompt text and decode settings and may return a response payload containing generated text and optional auxiliary data such as token counts, per-token scores, or tool-call traces. The artificial intelligence models 42 may represent distinct model families or versions and may support configurable decoding parameters, schema guards, and resource controls communicated by the orchestrator 40. The models 42 may support reuse of intermediate state across related requests within time windows, may emit partial results during generation when requested, and may surface diagnostics that may be persisted by the AI platform 14. The AI platform 14 may maintain registrations for available artificial intelligence models 42, may publish their capabilities to the orchestrator 40, and may provide administrative interfaces through which configurations and stage definitions may be updated without interrupting request handling.

In some embodiments, an AI platform 14 has four artificial intelligence models 42 in FIG. 1 for clarity, while other embodiments may register substantially more models and versions at once (e.g., more than 10, or more than 100). The platform may maintain a catalog in which each model 42 may advertise input and output modalities, supported decoding settings, schema constraints, resource limits, and health status. A controller or orchestrator 40 may read this catalog to select one or more models 42 for a request, while administrative interfaces may allow models to be added, disabled, or rolled back without interrupting service. Models 42 may be addressed individually or through stage aliases so that a pipeline may target a class of models rather than a single identifier, which may allow staged migrations and A/B splits across a fleet.

In some embodiments, models 42 may be trained separately or together. Separate training may proceed in its own pipeline per model: ingest training data, prepare batches, run forward passes, compute a loss signal according to the task, and apply parameter updates; checkpoints may be exported and registered when validation may meet a gate. Concurrent training may coordinate two or more models in a shared loop, for example by distilling a teacher model into a smaller student, by alternating updates between a retriever and a generator, or by sharing embeddings that may be updated jointly. A scheduler may partition accelerators across jobs, synchronize checkpoints at specified intervals, and write model cards that may summarize training data windows, hyperparameters, and evaluation scores so that the orchestrator 40 may route requests only to models that may satisfy deployment policy.

In some embodiments, the models 42 may be multimodal and heterogeneous. A text model may accept prompts and emit text; a vision model may accept images and emit labels, captions, or embeddings; an audio model may accept waveforms and emit transcripts or speaker turns; and a diffusion model may accept text and emit images through iterative sampling. Cross-modal adapters may be registered to convert outputs from one model to inputs for another, for example mapping an image encoder's embedding to a language model's hidden space, or converting a transcription into a structured prompt template. The orchestrator 40 may attach these adapters based on a stage definition so that heterogeneous models may be composed into a single request path.

In some embodiments, a large language model may be represented as a sequence model that may consume tokenized prompts and, during inference, may maintain a working cache of intermediate state while producing the next token repeatedly until a stop rule may be met. Training such a model may follow a loop that may read batches of token sequences, run forward passes to predict the next token at each position, compare predictions to references to compute a loss, and update parameters; fine-tuning may continue this loop on domain examples, and instruction-tuning may add formatting and constraint-following demonstrations. Decoding at inference may be controlled by settings such as sampling temperature, nucleus probability, maximum tokens, repetition penalties, and stop sequences, all of which the AI platform 14 may apply per request.

In some embodiments, a state space model may process long sequences by maintaining a compact state that may be advanced with each new input chunk. During inference, the model may read a segment of tokens or features, update its state using learned transition operators, and emit outputs for that segment; this segment-wise procedure may allow long contexts to be processed in a streaming manner. Training may sweep over long sequences with sliding windows, apply teacher forcing for stability, and update parameters based on a prediction or reconstruction objective. The platform may expose the state as an opaque handle so that later stages may continue from the same point without reprocessing earlier chunks.

In some embodiments, a diffusion model may synthesize or transform images by iteratively refining a noisy representation. During inference, the model may start from noise seeded by a sampler, and in a fixed number of steps may apply learned denoising updates that may be conditioned on a text prompt or an image reference. Schedulers may determine step sizes, and guidance scales may adjust adherence to conditioning. Training may proceed by adding noise to ground-truth images at sampled levels, asking the model to predict the noise or a denoised target, and updating parameters to reduce the prediction error. The platform may wrap this procedure behind an endpoint that may accept text, images, and control hints such as masks or edge maps.

In some embodiments, a computer vision model may perform classification, detection, segmentation, or optical character recognition. During inference, the model may read an image tensor, compute hierarchical features with convolutional or attention-based blocks, and emit class probabilities, bounding boxes, masks, or extracted text. Post-processing may apply thresholding and non-maximum suppression. Training may construct batches with augmentations, run forward passes to produce predictions, compute task-specific losses, and update parameters. The platform may expose pre-processing and post-processing steps as configurable handlers so that outputs may be normalized before being passed to later stages.

In some embodiments, a reinforcement learning model may interact with an environment to learn a policy. During training, the agent may observe a state, choose an action according to a policy network, receive a reward, and update the policy and, optionally, a value estimator using stored trajectories; curriculum schedules may adjust difficulty, and off-policy replay buffers may stabilize updates. During inference, the agent may read state representations and emit actions without parameter updates. The platform may host simulators or connect to external environments, and may expose the policy behind an endpoint that may accept state observations serialized from an upstream stage.

In some embodiments, additional model classes may be registered, including retrieval models that may rank passages, speech models that may perform recognition or synthesis, program synthesis models that may emit code, and graph models that may reason over structured relations. Each model 42 may define supported settings, pre-processing contracts, and output schemas, and the AI platform 14 may route requests so that heterogeneous and multimodal components may be composed into a single flow, whether four models are displayed in a figure or many more may be present in a deployment.

In some embodiments, the orchestrator 40 may coordinate the plurality of artificial intelligence models 42 by accepting a request that may include a system prompt, content prompt, context references, and routing hints, constructing an execution plan, and issuing a sequence of sub-requests to selected models 42 according to that plan. The orchestrator 40 may parse the incoming payload, may attach correlation identifiers, and may initialize a call graph that may record nodes for planned model invocations and edges for data dependencies among those nodes. The orchestrator 40 may evaluate routing policy to choose model 42 identifiers for each node, may assign decoding settings per node, and may submit sub-requests in an order that may satisfy data dependencies. As responses may arrive, the orchestrator 40 may extract artifacts such as generated prompts, structured fields, embeddings, or tool traces, may normalize these artifacts to a shared interchange format, and may inject them as inputs to downstream nodes in the call graph.

In some embodiments, the orchestrator 40 may implement agentic workflows by hosting a reasoning component that may construct and revise a plan at runtime. The reasoning component may run inside the orchestrator 40 or may be implemented as one of the artificial intelligence models 42. The reasoning component may ingest the user objective and available tools, may propose a sequence of steps that may reference specific model 42 capabilities, and may emit a plan object containing steps, branching conditions, and data mappings. The orchestrator 40 may execute the plan by iterating steps: submit a call to the designated model 42 with a prompt assembled from the current context; await a response; evaluate guard conditions expressed as simple checks or scoring functions; and either proceed to the next step, branch to an alternate step, or request a plan update from the reasoning component when checks may not pass. The orchestrator 40 may maintain a working memory that may store intermediate prompts and outputs and may serialize that memory so that later steps may reference earlier results without repeating prior calls.

In some embodiments, the orchestrator 40 may route requests among heterogeneous models 42 and may transform outputs from one model into inputs for another. For example, a vision model may emit a caption and detected entities that the orchestrator 40 may combine with a system prompt for a language model to generate a report; a retrieval model may emit passages and scores that the orchestrator 40 may attach as context to a question-answering prompt; a diffusion model may produce an image that the orchestrator 40 may pass to a second vision model for safety checks before releasing to a caller. These transformations may be expressed as adapters that may map fields, add delimiters, or enforce schema guards. The orchestrator 40 may also support fan-out and fan-in patterns in which a step may branch to multiple models 42 in parallel with varied prompts or settings, followed by an aggregation step that may select or merge the results using rules or a separate evaluator model.

In some embodiments, the orchestrator 40 may incorporate quality evaluation during execution. The orchestrator 40 may attach evaluators that may score intermediate responses against label functions, constraint checkers, or comparison heuristics, and may record those scores with the call graph. If a score may fall below a configured bound, the orchestrator 40 may trigger a retry with adjusted settings, may select an alternate model 42, or may ask the reasoning component for a revised plan. The orchestrator 40 may maintain stop conditions such as reaching a target score, exhausting a model 42 list, or hitting a budget of calls, and may terminate the workflow when a stop condition may be met. Final outputs may be assembled from nodes designated as sinks in the call graph and may include generated text, structured records, and provenance that may list model 42 identifiers, prompts, and settings used.

In some embodiments, prompt composition inside the orchestrator 40 may be dynamic. A node may specify a template whose placeholders may be filled with values produced by upstream nodes, such as inserting extracted fields, reformatting tables, or embedding citations. The orchestrator 40 may construct prompts by concatenating a system prompt and a content prompt and may append context documents or summaries; when a node may receive a prompt produced by another model 42, the orchestrator 40 may sanitize and tag that prompt before forwarding. Settings may be assigned per node by reading defaults from a registry and overriding fields such as sampling temperature, nucleus probability, maximum tokens, stop sequences, or schema constraints according to plan hints or evaluator feedback.

In some embodiments, the orchestrator 40 may operate in synchronous or asynchronous modes. In synchronous mode, the orchestrator 40 may execute the call graph inline, awaiting each dependency before advancing. In asynchronous mode, the orchestrator 40 may submit independent nodes concurrently, may await completion events, and may resume dependent nodes as their inputs may become available. The orchestrator 40 may record a timeline of submissions and completions, may propagate cancellation if a branch may become irrelevant, and may checkpoint the call graph so that long-running workflows may resume after transient failures.

In some embodiments, planning may be performed once at the start or iteratively. A one-shot plan may be constructed from the initial request and executed as written. An iterative plan may be updated after each major step: the orchestrator 40 may solicit a new plan from the reasoning component by providing a compact summary of the current state, including successes, failures, and evaluator scores; the reasoning component may propose additional steps, altered branches, or revised prompts; and the orchestrator 40 may apply the update to the running call graph. This arrangement may allow branching based on responses, repeated refinement cycles, or backtracking when an approach may not meet checks, while keeping the flow grounded in explicit calls to the artificial intelligence models 42.

In some embodiments, the orchestrator 40 may expose administrative controls to register models 42, attach adapters, define plan templates, and configure evaluators and thresholds. The orchestrator 40 may log prompts, settings, responses, and decisions with identifiers so that replay or audit may be performed, and may export summarized traces to downstream systems. The orchestrator 40 may support staged deployments in which only a fraction of traffic may exercise new plans or model 42 versions, with the remainder using prior configurations, and may switch traffic based on observed evaluator scores.

In some embodiments, an orchestrator 40 may perform retrieval-augmented generation by constructing context to pair with prompts submitted to artificial intelligence models 42. The orchestrator 40 may parse an incoming request, extract queryable terms or entities, and issue retrieval calls to one or more backends such as vector indexes, structured databases, key-value stores, or web connectors. For vector retrieval, the orchestrator 40 may compute or request an embedding for the request, search a vector database for nearest neighbors under a configured similarity rule, and fetch the corresponding passages together with metadata such as source identifiers and timestamps. For structured retrieval, the orchestrator 40 may prepare parameterized SQL statements that may target tables designated for facts, events, or configurations, and may execute the statements with bound parameters to obtain rows that may be normalized into text spans or key-value fragments. The orchestrator 40 may merge results across sources by de-duplicating near-identical passages, ranking candidates using a learned or heuristic ranker, and assembling a context window that may satisfy token budgets and policy filters prior to pairing the context with a system prompt and content prompt.

In some embodiments, the orchestrator 40 may call an artificial intelligence model 42 to assist with retrieval by generating or refining queries. The orchestrator 40 may submit a step that asks the model 42 to produce search strings, embeddings, or structured queries given the user objective and available schema hints. For example, the model 42 may emit a vector-query description, a set of Boolean search clauses, or a parameterized SQL statement. The orchestrator 40 may validate and sanitize the proposed query, may execute it against the configured backend, and may return retrieved snippets to the model 42 for summarization or citation selection. The orchestrator 40 may iterate this loop by asking the model 42 to propose follow-up queries for uncovered aspects, may expand abbreviations or entity aliases, and may re-rank retrieved items based on the model's extracted signals such as answerability or freshness labels.

In some embodiments, the orchestrator 40 may construct the final context pack by chunking documents to configured sizes, adding canonical citations, and applying filters that may remove low-confidence or stale items. The orchestrator 40 may enforce per-source quotas so that no single repository dominates the context, may insert guardrail headers that may list provenance and usage instructions, and may compress or summarize overlong passages using a model 42 prior to assembly. The resulting context pack may be concatenated ahead of or after a system prompt and content prompt and may be sent with decoding settings to a selected model 42. The orchestrator 40 may cache embeddings, intermediate search results, and assembled context packs keyed by request fingerprints so that repeated or related requests may reuse retrieval results within defined lifetimes, and may align the context layout to maximize shared prefixes across related prompts where reuse of a key-value cache on the target model 42 may be supported.

In some embodiments, the one or more artificial intelligence models 42 may be hosted locally, including fine-tuned variants deployed within an enterprise environment. In other embodiments, the models may be remote, third-party hosted, general-purpose foundation models accessed over a network through service endpoints. Hybrid arrangements may be used in which certain stages run on local fine-tuned models while other stages call external foundation models.

Figure 2:
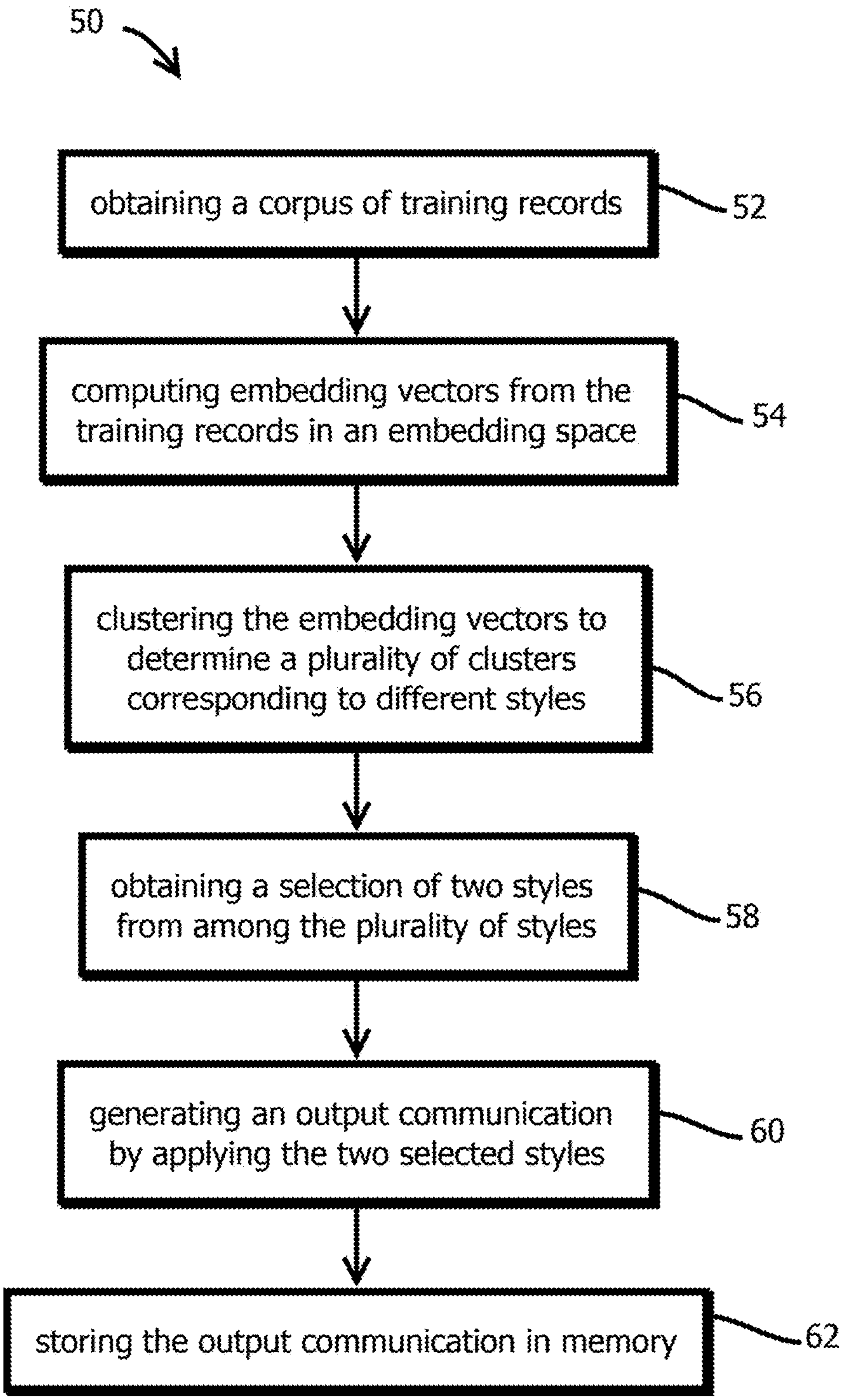
FIG. 2 illustrates an example of a process that may be executed by the style transfer system in accordance with some embodiments.

FIG. 2 is a flow chart depicting an example of a process 50 that may be executed by the style transfer system 12 above or by other systems. In some embodiments, the process 50 includes obtaining a corpus of training records, as indicted by block 52. Next, some embodiments may compute embedding vectors from the training records in an embedding space as indicated by block 54. Some embodiments may cluster the embedding vectors to determine a plurality of clusters corresponding to different communication styles as indicated by block 56. Next, some embodiments may obtain a selection of two or more styles from among the plurality of styles as indicated by block 58, for example, some embodiments may mix three, four, five, or more styles in some cases with different weightings applied to the different styles to affect the strength of their contribution to the resulting aggregate style. Some embodiments may generate an output communication by applying the two or more selected styles as indicated by block 60. Some embodiments may store the output communication in memory as indicated by block 62 before sending the output communication to a requesting user or computing process.

Figure 3:
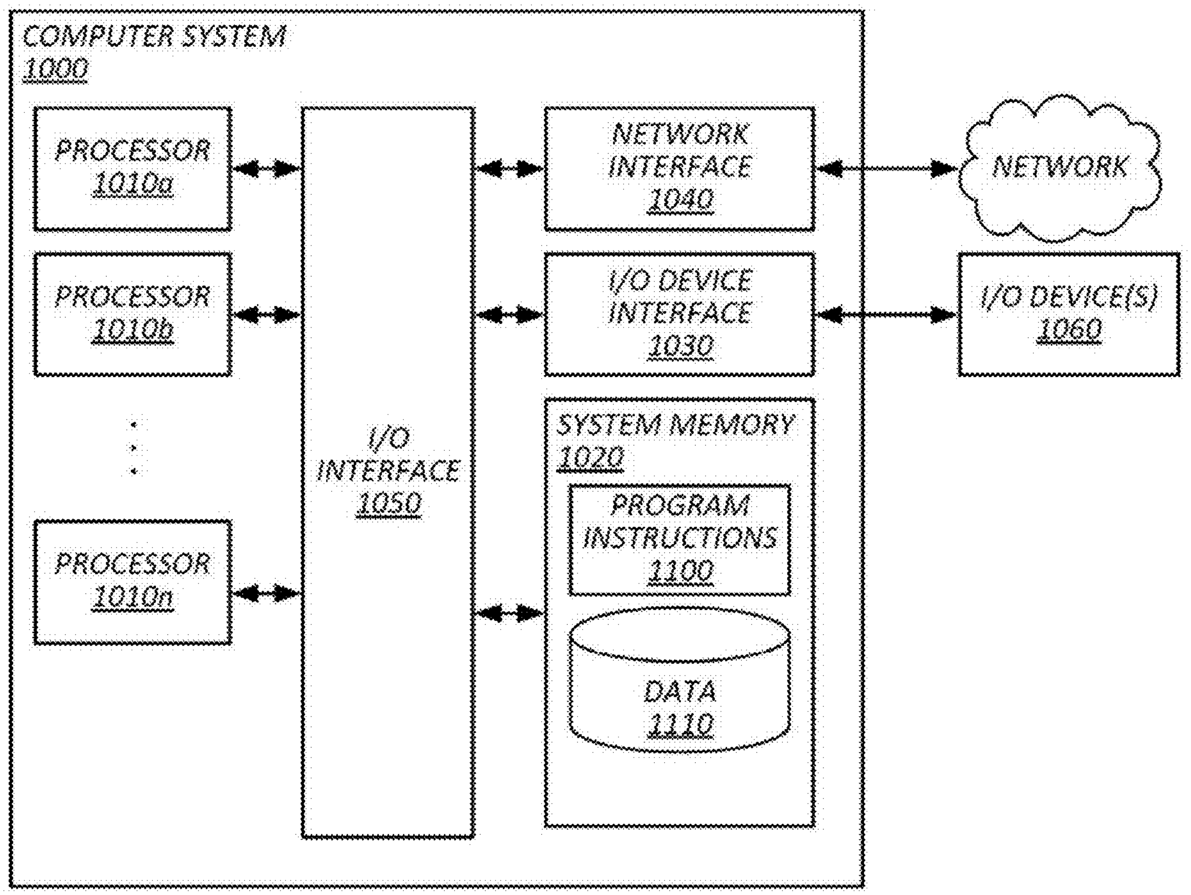
FIG. 3 illustrates an example of a computing device from which computing systems that are executed by the style transfer system may be implemented.

FIG. 3 is a diagram that illustrates an exemplary computing device 1000 by which computing systems that implement the above techniques may be implemented. A single computing device is shown, but some embodiments of a computer system may include multiple computing devices that communicate over a network, for instance in the course of collectively executing various parts of a distributed application. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

embodiment 1. A method, comprising: obtaining, with a computer system, a corpus of training records; computing, with the computer system, embedding vectors from the training records in an embedding space in which spatial proximity corresponds to similarity in style of communication of the corresponding training records; clustering, with the computer system, the embedding vectors to determine a plurality of clusters corresponding to different styles of communication; obtaining, with the computer system, a selection of two styles from among the plurality of styles corresponding to two respective clusters among the plurality of clusters; generating, with the computer system, an output communication by applying the two selected styles; and storing, with the computer system, the output communication in memory.

embodiment 2. The method of embodiment 1, wherein obtaining the selection of the two styles includes obtaining a weight for each of the two styles indicating a relative strength with which the respective style is to be applied during the generating.

embodiment 3. The method of embodiment 1, wherein the training records comprise a plurality of modalities including natural-language text documents and audio or video.

embodiment 4. The method of embodiment 3, wherein computing the embedding vectors comprises computing a first embedding vector for a first training record in a first modality among the plurality of modalities, computing a second embedding vector for a second training record in a second modality among the plurality of modalities, and transforming the first embedding vector and the second embedding vector with a cross-attention encoder into third and fourth embedding vectors, respectively, in the embedding space.

embodiment 5. The method of embodiment 4, wherein training the cross-attention encoder comprises computing a training loss that increases similarity between embedding vectors of records sharing a style label and decreases similarity between embedding vectors of records with different style labels.

embodiment 6. The method of embodiment 3, wherein computing the embedding vectors comprises computing the embedding vectors with a plurality of encoders respectively corresponding to the plurality of modalities, the plurality of encoders being trained with a contrastive objective using matched cross-modal pairs of a training set.

embodiment 7. The method of embodiment 1, wherein clustering comprises sweeping a clustering parameter through a range of values, tracking changes in membership of the clusters across the range, and selecting a value or range of values at which cluster memberships are stable.

embodiment 8. The method of embodiment 1, wherein clustering the embedding vectors comprises constructing a k-nearest-neighbor graph over the embedding vectors, generating a graph filtration by increasing a neighborhood radius, computing topological summaries of connected components across the filtration, selecting a neighborhood radius at which a count of connected components persists above a threshold, and assigning the connected components at the selected radius as the plurality of clusters.

embodiment 9. The method of embodiment 1, wherein clustering the embedding vectors comprises computing, for each embedding vector, a numeric score summarizing its position in the embedding space including at least one of local density or a projection value, organizing a range of the scores into overlapping intervals, within each interval grouping nearby embedding vectors into local clusters, and linking local clusters from different intervals when they share one or more embedding vectors due to the overlap, wherein connected sets of linked local clusters define the plurality of clusters.

embodiment 10. The method of embodiment 1, wherein clustering the embedding vectors comprises determining, for each embedding vector, whether at least a threshold number of other embedding vectors lie within a threshold distance to indicate a locally dense region, connecting embedding vectors that are reachable through a chain of such locally dense regions, varying the threshold distance to identify groups of embedding vectors that remain intact over a range of threshold distances, and designating embedding vectors in groups that persist over more than a threshold amount of variation of the threshold distance as the plurality of clusters while marking embedding vectors not in any such group as outliers.

embodiment 11. The method of embodiment 1, comprising providing a user interface that enables a user to input weights to mix different styles at user-specified strengths into an aggregate style applied during the generating.

embodiment 12. The method of embodiment 1, comprising computing scores for the styles based on at least frequency of use and recency, and selecting among the styles based on the scores using Bayesian updating or reinforcement learning.

embodiment 13. The method of embodiment 1, comprising obtaining user-specific data and context-specific data for a given prompt and, using a dual-encoder model, blending two or more of the styles based on the user-specific data and the context-specific data.

embodiment 14. The method of embodiment 1, comprising selecting among the plurality of styles with a memory-augmented neural network that records values indicative of previous user interactions.

embodiment 15. The method of embodiment 1, comprising adjusting the styles with a reinforcement-learning model based on values indicative of user preferences.

embodiment 16. The method of embodiment 1, comprising predicting, with a trained model, at least one style from among the plurality of styles to apply to the output communication based on the training records or on context of a prompt.

embodiment 17. The method of embodiment 1, wherein computing the embedding vectors comprises applying a neural-network encoder to each of the training records to generate the embedding vectors, and wherein clustering comprises grouping the embedding vectors according to distances in the embedding space.

embodiment 18. The method of embodiment 1, wherein generating the output communication comprises generating text according to a designated style or mixture of styles corresponding to the selection.

embodiment 19. The method of embodiment 1, wherein: (i) computing the embedding vectors comprises applying a neural-network encoder trained with a contrastive objective to increase cosine similarity between embedding vectors of training records sharing a style label and to decrease cosine similarity otherwise, such that spatial proximity in the embedding space corresponds to similarity in style of communication; (ii) clustering comprises constructing a neighbor graph over the embedding vectors and selecting, as the plurality of clusters, connected components at a neighborhood radius for which a count of connected components remains stable across a range of radii; (iii) the styles of communication are defined independent of topic by one or more of sentence-length distribution, lexical diversity, syntactic formality, and punctuation or prosodic patterns; (iv) obtaining the selection of the two styles includes assigning respective non-negative weights that sum to one; (v) generating the output communication comprises conditioning a language model using, for each of the two selected styles, a style token having an embedding derived from a centroid of the corresponding cluster and applying the respective weights; and (vi) the corpus of training records includes records labeled for style and balanced across at least two styles to at least a threshold proportion.

embodiment 20. A tangible, non-transitory, machine-readable medium storing instructions that when executed by a data processing apparatus cause the data processing apparatus to perform operations comprising: the operations of any one of embodiments 1 through 19.

embodiment 21. A system, comprising: one or more processors; and memory storing instructions that when executed by the processors cause the processors to effectuate operations comprising: the operations of any one of embodiments 1 through 19.

What is claimed is:

1. A method, comprising:

obtaining, with a computer system, a corpus of training records;

computing, with the computer system, embedding vectors from the training records in an embedding space in which spatial proximity corresponds to similarity in style of communication of the corresponding training records;

clustering, with the computer system, the embedding vectors to determine a plurality of clusters corresponding to a plurality of different styles of communication;

obtaining, with the computer system, a selection of two styles from among the plurality of styles corresponding to two respective clusters among the plurality of clusters;

generating, with the computer system, an output communication by applying the two selected styles; and storing, with the computer system, the output communication in memory, wherein: (i) computing the embedding vectors comprises applying a neural-network encoder trained with a contrastive objective to increase cosine similarity between embedding vectors of training records sharing a style label and to decrease cosine similarity otherwise, such that spatial proximity in the embedding space corresponds to similarity in style of communication; (ii) clustering comprises constructing a neighbor graph over the embedding vectors and selecting, as the plurality of clusters, connected components at a neighborhood radius for which a count of connected components remains stable across a range of radii; (iii) the styles of communication are defined independent of topic by one or more of sentence-length distribution, lexical diversity, syntactic formality, and punctuation or prosodic patterns; (iv) obtaining the selection of the two styles includes assigning respective non-negative weights that sum to one; (v) generating the output communication comprises conditioning a language model using, for each of the two selected styles, a style token having an embedding derived from a centroid of the corresponding cluster and applying the respective weights; and (vi) the corpus of training records includes records labeled for style and balanced across at least two styles to at least a threshold proportion.

2. The method of claim 1, wherein obtaining the selection of the two styles includes obtaining a weight for each of the two styles indicating a relative strength with which the respective style is to be applied during the generating.

3. The method of claim 1, wherein the training records comprise a plurality of modalities including:

natural-language text documents; and audio or video.

4. The method of claim 3, wherein computing the embedding vectors comprises:

computing a first embedding vector for a first training record in a first modality among the plurality of modalities;

computing a second embedding vector for a second training record in a second modality among the plurality of modalities; and transforming the first embedding vector and the second embedding vector with a cross-attention encoder into third and fourth embedding vectors, respectively, in the embedding space.

5. The method of claim 4, wherein training the cross-attention encoder comprises computing a training loss that increases similarity between embedding vectors of records sharing a style label and decreases similarity between embedding vectors of records with different style labels.

6. The method of claim 3, wherein computing the embedding vectors comprises computing the embedding vectors with a plurality of encoders respectively corresponding to the plurality of modalities, the plurality of encoders being trained with a contrastive objective using matched cross-modal pairs of a training set.

7. The method of claim 1, wherein clustering comprises sweeping a clustering parameter through a range of values, tracking changes in membership of the clusters across the range, and selecting a value or range of values at which cluster memberships are stable.

8. The method of claim 1, wherein clustering the embedding vectors comprises:

constructing a k-nearest-neighbor graph over the embedding vectors;

generating a graph filtration by increasing a neighborhood radius;

computing topological summaries of connected components across the filtration;

selecting a neighborhood radius at which a count of connected components persists above a threshold; and assigning the connected components at the selected radius as the plurality of clusters.

9. The method of claim 1, wherein clustering the embedding vectors comprises:

computing, for each embedding vector, a numeric score summarizing its position in the embedding space including at least one of local density or a projection value;

organizing a range of the scores into overlapping intervals;

within each interval, grouping nearby embedding vectors into local clusters; and linking local clusters from different intervals when they share one or more embedding vectors due to the overlap, wherein connected sets of linked local clusters define the plurality of clusters.

10. The method of claim 1, wherein clustering the embedding vectors comprises:

determining, for each embedding vector, whether at least a threshold number of other embedding vectors lie within a threshold distance to indicate a locally dense region;

connecting embedding vectors that are reachable through a chain of such locally dense regions;

varying the threshold distance to identify groups of embedding vectors that remain intact over a range of threshold distances; and designating embedding vectors in groups that persist over more than a threshold amount of variation of the threshold distance as the plurality of clusters, and marking embedding vectors not in any such group as outliers.

11. The method of claim 1, comprising providing a user interface that enables a user to input weights to mix different styles at user-specified strengths into an aggregate style applied during the generating.

12. The method of claim 1, comprising:

computing scores for the styles based on at least frequency of use and recency; and selecting among the styles based on the scores using Bayesian updating or reinforcement learning.

13. The method of claim 1, comprising obtaining user-specific data and context-specific data for a given prompt and, using a dual-encoder model, blending two or more of the styles based on the user-specific data and the context-specific data.

14. The method of claim 1, comprising selecting among the plurality of styles with a memory-augmented neural network that records values indicative of previous user interactions.

15. The method of claim 1, comprising adjusting the styles with a reinforcement-learning model based on values indicative of user preferences.

16. The method of claim 1, comprising predicting, with a trained model, at least one style from among the plurality of styles to apply to the output communication based on the training records or on context of a prompt.

17. The method of claim 1, wherein computing the embedding vectors comprises applying the neural-network encoder to each of the training records to generate the embedding vectors, and wherein clustering comprises grouping the embedding vectors according to distances in the embedding space.

18. The method of claim 1, comprising generating another output communication by generating text according to a designated style or mixture of styles corresponding to another selection.

19. A tangible, non-transitory, machine-readable medium storing instructions that, when executed, effectuate operations comprising:

obtaining, with a computer system, a corpus of training records;

computing, with the computer system, embedding vectors from the training records in an embedding space in which spatial proximity corresponds to similarity in style of communication of the corresponding training records;

clustering, with the computer system, the embedding vectors to determine a plurality of clusters corresponding to a plurality of different styles of communication;

obtaining, with the computer system, a selection of two styles from among the plurality of styles corresponding to two respective clusters among the plurality of clusters;

generating, with the computer system, an output communication by applying the two selected styles; and storing, with the computer system, the output communication in memory, wherein: (i) computing the embedding vectors comprises applying a neural-network encoder trained with a contrastive objective to increase cosine similarity between embedding vectors of training records sharing a style label and to decrease cosine similarity otherwise, such that spatial proximity in the embedding space corresponds to similarity in style of communication; (ii) clustering comprises constructing a neighbor graph over the embedding vectors and selecting, as the plurality of clusters, connected components at a neighborhood radius for which a count of connected components remains stable across a range of radii; (iii) the styles of communication are defined independent of topic by one or more of sentence-length distribution, lexical diversity, syntactic formality, and punctuation or prosodic patterns; (iv) obtaining the selection of the two styles includes assigning respective non-negative weights that sum to one; (v) generating the output communication comprises conditioning a language model using, for each of the two selected styles, a style token having an embedding derived from a centroid of the corresponding cluster and applying the respective weights; and (vi) the corpus of training records includes records labeled for style and balanced across at least two styles to at least a threshold proportion.

* * * * *